(12) United States Patent
Mukherjee et al.

(10) Patent No.: US 11,681,505 B2
(45) Date of Patent: Jun. 20, 2023

(54) SYSTEMS AND METHODS FOR FACILITATING GENERATION AND DEPLOYMENT OF MACHINE LEARNING SOFTWARE APPLICATIONS

(71) Applicant: Opentrons Labworks Inc., Brooklyn, NY (US)

(72) Inventors: Sankha Subhra Mukherjee, Belfast (GB); Rolf Hugh Baxter, Holywood (GB); Neil Martin Robertson, Holywood (GB)

(73) Assignee: OPENTRONS LABWORKS INC., Brooklyn, NY (US)

(*) Notice: Subject to any disclaimer, the term of this patent is extended or adjusted under 35 U.S.C. 154(b) by 0 days.

(21) Appl. No.: 17/305,027

(22) Filed: Jun. 29, 2021

(65) Prior Publication Data
US 2022/0413814 A1 Dec. 29, 2022

(51) Int. Cl.
*G06F 8/36* (2018.01)
*G06F 9/451* (2018.01)
(Continued)

(52) U.S. Cl.
CPC ............ *G06F 8/36* (2013.01); *G06F 8/44* (2013.01); *G06F 8/60* (2013.01); *G06F 9/451* (2018.02); *G06F 9/48* (2013.01); *G06N 20/00* (2019.01)

(58) Field of Classification Search
CPC ... G06F 8/36; G06F 9/451; G06F 8/44; G06F 8/60; G06F 9/48; G06N 20/00
(Continued)

(56) References Cited

U.S. PATENT DOCUMENTS 6,031,533 A * 2/2000 Peddada ................. G06F 8/61
715/733
2018/0089592 A1* 3/2018 Zeiler .................. G06F 16/212
(Continued)

OTHER PUBLICATIONS

Greenfield et al, "Software Factories Assembling Applications with Patterns, Models, Frameworks and Tools", 2003, [Online], pp. 16-27, [Retrieved from internet on Jan. 24, 2023], <https://dl.acm.org/doi/pdf/10.1145/949344.949348> (Year: 2003).*
(Continued)

*Primary Examiner* — S. Sough
*Assistant Examiner* — Zengpu Wei
(74) *Attorney, Agent, or Firm* — Wilson Sonsini Goodrich & Rosati

(57) ABSTRACT

Generally described, one or more aspects of the present application relate to improving the process of generating and deploying software applications in a network environment, particularly software applications that incorporate or rely upon machine learning models. More specifically, the present disclosure provides specific user interface features and associated computer-implemented features that may effectively, from a user's perspective, remove most of the complexities associated with writing and deploying code and developing and improving machine learning models. For example, the present disclosure may provide user-friendly visual building blocks that allow users to build and customize machine learning workflows that can then be turned into a full software application and optimized and deployed at target destinations of the users' choice.

28 Claims, 24 Drawing Sheets

(51) Int. Cl.
*G06N 20/00* (2019.01)
*G06F 8/41* (2018.01)
*G06F 8/60* (2018.01)
*G06F 9/48* (2006.01)

(58) Field of Classification Search
USPC .......................................................... 717/170
See application file for complete search history.

(56) References Cited

U.S. PATENT DOCUMENTS

| | | | |
|---|---|---|---|
| 2018/0129720 A1* | 5/2018 | Kim | G06F 16/248 |
| 2019/0156246 A1* | 5/2019 | Kuo | G06K 9/6256 |
| 2020/0193221 A1* | 6/2020 | Aftab | G06N 3/08 |
| 2020/0380415 A1* | 12/2020 | Siracusa | G06N 3/08 |
| 2021/0064346 A1* | 3/2021 | Exertier | G06F 8/60 |
| 2021/0081842 A1 | 3/2021 | Polleri et al. | |
| 2021/0081848 A1* | 3/2021 | Polleri | G06F 16/9024 |
| 2021/0157312 A1* | 5/2021 | Celia | G06N 20/00 |

OTHER PUBLICATIONS

PCT International Search Report and Written Opinion in Equivalent PCT International Application No. PCT/US2022/035140, dated Oct. 13, 2022, in 30 pages.

\* cited by examiner

FIG. 3E

SYSTEMS AND METHODS FOR FACILITATING GENERATION AND DEPLOYMENT OF MACHINE LEARNING SOFTWARE APPLICATIONS

TECHNICAL FIELD

This disclosure relates to the field of software applications, and particularly to techniques for facilitating generation and deployment of software applications via graphical user interface tools.

BACKGROUND

A software application can include numerous libraries and modules that facilitate the performance of the various tasks accomplished by the software application. Such a software application can also be deployed to a target destination so that the software application can be accessed by its intended users.

BRIEF DESCRIPTION OF THE DRAWINGS

FIGS. 3A-3H depict user interface screenshots illustrating an example process of executing a customized workflow, visualizing the result of the execution, and deploying the customized workflow, in accordance with aspects of the present disclosure.

DETAILED DESCRIPTION

Introduction

Figure 1:
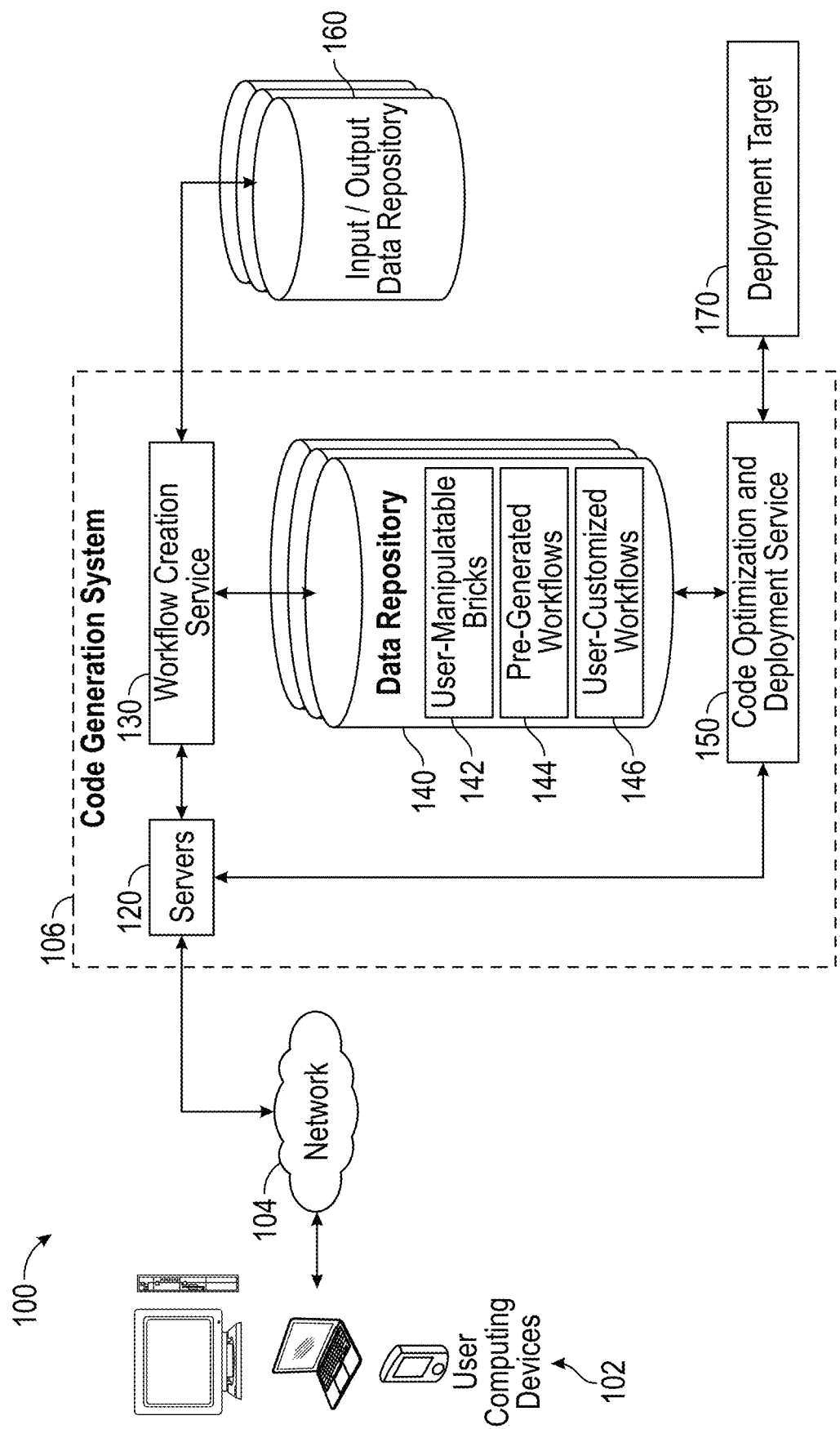
FIG. 1 depicts a schematic diagram of a network environment in which a code generation system is used to implement a workflow creation service and a code optimization and deployment service, in accordance with aspects of the present disclosure.

The present disclosure generally relates to improving the process of generating and deploying software applications in a network environment, particularly software applications that incorporate or rely upon machine learning models. Writing a software application can be a time-consuming and complicated process. Traditionally, a developer maps out the various tasks that need to be performed by the software application and writes source code that includes numerous libraries and modules that facilitate the performance of those. Then, after a considerable amount of testing, the software application is deployed to a target destination so that the software application can be accessed by its intended users. Additionally, prior to deployment, the software application may need to be fine-tuned according to the characteristics of the target destination (e.g., availability of processing power and network bandwidth). Being able to accomplish all of these tasks typically requires years of training and experience in software development. Further, to be able to write software applications that deal with highly specialized areas such as artificial intelligence and machine learning, additional technical expertise is typically required. Thus, more efficient and user-friendly techniques for generating and deploying software applications that relate to artificial intelligence and machine learning are desired.

The aforementioned challenges, among others, are addressed in some embodiments by the disclosed techniques for facilitating generation and deployment of software applications. More specifically, the presently disclosed technology addresses these deficiencies through specific user interface features and associated computer-implemented features that may effectively, from a user's perspective, remove most of the complexities associated with writing and deploying code and developing and improving machine learning models, and by providing more user-friendly visual building blocks that allow users to build and customize machine learning workflows that can then be turned into a full software application and optimized and deployed at target destinations of the users' choice.

As will be appreciated by one of skill in the art in light of the present disclosure, the embodiments disclosed herein improve the ability of computing systems, such as code generation systems, code modification systems, systems for building and training machine learning models, code optimization systems, code deployment systems, etc., to provide more efficient code generation and deployment techniques. By providing user-friendly visual building blocks (also referred to herein as "bricks") that are presented in an interactive graphical user interface and pre-generated workflows that can easily be modified to generate customized workflows, the code generation system of the present disclosure can address the deficiencies described above.

Prior techniques generally focused on automating the code writing for certain programming tasks that are related to adding graphical elements or pre-programmed code modules to a software application. For example, a prior code generation system may allow a user to add user interface elements such as text fields or drop-down menus, or software widgets such as a calendar widget, a weather widget, or a to-do-list widget to the software application by dragging and dropping such components into different parts of the software application. However, such approaches may still require the user to have a deep understanding of code-writing so that the software application can be finalized, tested, and deployed. Also, such approaches may not allow the user to perform more complicated tasks that are required in building, testing, and deploying machine learning software applications, in which various technical choices made in design of the software (such as feature selection, choice of machine learning model types for a particular use case, training of a model, etc.) are not well suited to traditional drag and drop functionality implemented with respect to more simplified widget-based design environments.

In contrast, embodiments of the present disclosure enable the code generation system to perform various programming tasks relevant to machine learning software applications such as, for example, transforming image data or other data into input features for a machine learning model (e.g., extracting features from image data or other raw data), training and re-training the machine learning model, and connecting various inputs and outputs to the machine learning model, all in a fully customized, user-friendly manner. By doing so, the code generation system allows a customized machine learning application to be built, tested, re-trained, optimized, and deployed in a much more efficient manner, thereby reducing the consumption of both human and computing resources. Further, the code generation system can generate machine learning applications that are optimized for their target destinations, thereby improving the performance of the machine learning models included in the applications.

The presently disclosed embodiments therefore address technical problems inherent within computing systems, and more specifically within code generation systems and machine learning systems, such as reducing the consumption of computing resources and improving the performance of machine learning models. These technical problems are addressed by the various technical solutions described herein, including providing pre-configured workflows that can be used to perform various machine learning tasks, providing user-friendly visual building blocks that can be added to the pre-configured workflows to further customize the workflow, executing and visualizing the execution results so that the customized workflow can be tested, improved, and turned into a machine learning application, and optimizing and deploying the machine learning application onto target destinations of the user's choice. Thus, the present disclosure represents an improvement on existing code generation systems, and computing systems in general.

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only, and are not intended to be limiting.

Overview of Example Computing Environment for Code Generation System

The illustrative network environment 100 shown in FIG. 1 includes a code generation system 106 according to one embodiment. The code generation system 106 enables a user to generate, test, optimize, and deploy software applications using the various services provided by the code generation system 106. More specifically, the code generation system 106 may present, to the user, a graphical user interface that includes a set of user-manipulatable bricks that are drag-gable, connectable to each other, and configurable in the graphical user interface to define a workflow, which can then be used to generate a software application that can be tested, optimized, and deployed onto a deployment target of the user's choice. The techniques utilized by the code generation system 106 are described in greater detail below with references to FIGS. 1-11.

By way of illustration, various example user computing devices 102 are shown in communication with the code generation system 106 via a network 104. The user computing devices 102 can be any computing device such as a desktop, a laptop, a mobile phone (or smartphone), a tablet, a kiosk, a television, a wristwatch (including a smartwatch), a wireless device, a media player, one or more processor devices, integrated circuit components for inclusion in computing devices, and the like.

The network 104 over which the user computing devices 102 can access the code generation system 106 may be any wired network, wireless network, or combination thereof. In addition, the network 104 may be a personal area network, local area network, wide area network, over-the-air broadcast network (for radio or television, for example), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks.

In the depicted embodiment, the code generation system 106 includes servers 120, which can communicate with the user computing devices 102 over the network 104 and provide access to various services of the code generation system 106. In the example of FIG. 1, the services provided by the code generation system 106 include a workflow creation service 130 and a code optimization and deployment service 150. The workflow creation service 130 may perform tasks that relate to assisting the user in the creation of the user-defined (or user-customized) workflow that can be turned into a software application, and the code optimization and deployment service 105 may perform tasks that relate to assisting the user in the optimization and deployment of the software application generated using the user-defined workflow. In some embodiments, these services can be implemented as software components executing in physical computer hardware on the servers 120 or in separate computing devices. The tasks performed by the workflow creation service 130 and the code optimization and deployment service 150 are described in greater below with reference to FIGS. 2-10.

The code generation system 106 also includes a data repository 140 storing user-manipulatable bricks 142, pre-generated workflows 144, and user-customized workflows 146. Although shown in FIG. 1 as being stored as discrete objects or files, in some embodiments, the user-manipulatable bricks 142, pre-generated workflows 144, and user-customized workflows 146 may be stored as a single object or stored in a distributed manner on multiple data repositories. In some cases, one or more of the user-manipulatable bricks 142, pre-generated workflows 144, and user-customized workflows 146 may be stored as multiple objects or files.

The user-manipulatable bricks 142 shown as stored in the data repository 140 may include data usable to cause one or more user-manipulatable bricks to be displayed in a workflow modification user interface (e.g., a graphical user interface that allows the user to interact with various visual tools or icons to construct and customize a workflow). Such data may include details about a plurality of bricks made available to the user as building blocks for generating the workflows described herein, such as brick type, one or more tasks associated with the brick (e.g., those performed by the code module(s) corresponding to the brick), a list of parameters configurable by the user for the brick (e.g., location of the input or output data for an I/O brick, amount of blur to be applied for a transform brick, type of visualization to be presented for an evaluation brick, location of the machine learning classifier for a learnable brick, etc.).

The term "brick," when used herein with respect to display of a brick in a user interface, is often used herein to refer to a graphical representation of one or more artificial intelligence/machine learning, data I/O, data transformation, or data visualization tasks (e.g., object detection, data labeling, image resizing, data concatenation, ROC curve visualization, etc.), where such graphical representation is presented via a workflow modification user interface or other interface as visual elements or icons that a user can interact with and modify in order to create a customized workflow. In other instances and/or embodiments, the term "brick" can refer to the underlying function(s) or code module(s) that can perform the task(s) associated with the brick, which may be stored with a corresponding name, brick type, various metadata (e.g., permitted input and output data types for the code module(s)), and/or other data that is usable by the system both for generating a graphical representation of the brick and for ultimately producing executable code. For example, a "resize" brick may refer to the box shown in FIG. 2C in some context, or refer to the underlying code module that is used to perform the resizing in another context.

As described in greater detail below, a brick may be associated with one or more functions or code modules, and a collection of bricks can be arranged and connected in a specific manner to create a workflow. The workflow can be turned into an executable and/or deployable software application by taking all the functions or code modules corresponding to the bricks included in the workflow and piecing them together according to the specific manner in which the bricks are arranged and connected in the workflow. The software application can be executed for testing and visualization and can further be deployed in a target environment for use by other users and applications.

The pre-generated workflows 144 (also referred to herein as preconfigured workflows) shown as stored in the data repository 140 may include data containing information about workflows that were previously generated by the code generation system 106 and made available to the users to be used as starting points to create user-customized workflows. The user-customized workflows 146 (also referred to herein as user-defined workflows) shown as stored in the data repository 140 may include data containing information about workflows that are generated and saved by the users. For example, a user-customized workflow 146 may be a modified version of one of the pre-generated workflows 144.

As shown in FIG. 1, the workflow creation service 130 communicates with an input/output data repository 160 to retrieve input data and store output data, and the code optimization and deployment service 150 communicates with a deployment target 170 to deploy the software application generated using the user-defined workflow onto the deployment target 170. Although the input/output data repository 160 is shown as a single repository, in some embodiments, the input/output data repository 160 may include multiple repositories, data sources, or data providers (some of which may be on the user computing device 102 or another location not shown in FIG. 1), and the workflow creation service 130 may fetch or receive the input data as configured for an I/O brick of a pre-generated or user-customized workflow from such repositories/sources/providers, and the workflow creation service 130 may provide or store the output data as configured for another I/O brick of the pre-generated or user-customized workflow onto such repositories/sources/providers. The deployment target 170 may be the environment in which the software application is to be executed and/or accessed, and may include, for example, an edge device, a cloud server, and an embedded system, to name a few. Further, as shown in FIG. 1, the workflow creation service 130 and the code optimization and deployment service 150 may access the data repository 140 to access and store any of the user-manipulatable bricks 142, the pre-generated workflows 144, and the user-customized workflows 146.

The code generation system 106 may provide user interfaces (e.g., workflow modification user interface described above) and/or instructions to generate such user interfaces for display upon the user computing devices 102, for example, via a navigation and/or browsing interface such as a browser or application installed on the user computing devices 102, and the users on the user computing devices 102 may utilize the various services provided by the code generation system 106 such as the workflow creation service 130 and the code optimization and deployment service 150 via the user interfaces.

Although FIG. 1 illustrates an example in which the workflow creation service 130 and the code optimization deployment service 150 are implemented in the code generation system 106 external to the user computing devices 102 (e.g., in the "cloud" accessible via the network 104), in other embodiments, one or both of these services (or portions thereof) can be implemented on the user computing devices 102. In such embodiments, the workflow creation, code optimization, and/or code deployment may take place entirely on the user computing device 102 or in the user's local network environment without communicating with a remote server in the cloud. In other embodiments, the workflow creation, code optimization, and/or code deployment are performed in a distribute manner such that some tasks are performed on the user computing devices 102 and other tasks are performed on a remote server. Also, although the data repository 140 is shown in FIG. 1 as being part of the code generation system 106, and the input/output data repository 160 is shown as being external to both the user computing devices 102 and the code generation system 106, in other embodiments, one or both of these repositories can be implemented within the user computing devices 102 (or implemented on the user's local network environment), within the code generation system 106, or external to both the user computing devices 102 (or the user's local network environment) and the code generation system 106.

To initiate the process of creating a user-customized workflow on behalf of a user, the workflow creation service 130 may allow the user to submit a workflow creation request. Such a workflow creation request may specify a problem that the user is trying to solve, a set of resources allocated to generating a solution to the problem, a deployment target at which the solution is to be made available (or to which the solution is to be exported), and a set of resources available for use in executing the solution at the deployment target. For example, the problem may be detecting blurred or low-quality images with a 99% accuracy, the budget may be 100 units of processing power and 50 units of memory allotted for generating the software application, and the compute resource may be 50 units of processing power and 25 units of memory available in the deployment environment for executing the software application.

In some embodiments, the workflow creation request can take the form of a series of questions and answers. For example, the system may prompt the user to fill out a form to help the system understand the problem with the following series of example questions:

Q: What do you want?
A: I want a car classification model.
Q: Do you have data?
A: Yes.
Q: How many data points do you have?
A: 10,000 data points.
Q: How many categories?
A: 10.
Q: Are all data points labeled?
A: Yes.
Q: Does the data represent all cases of your problem?
A: I am not sure.
Q: In what format is your dataset? Please choose one of the formats shown below.
A: Folder and subfolders. I have a folder named 'cars'. And there are N subfolders, and each folder corresponds to a different category.

In the example described above, if the code generation system 106 has access to a pre-generated car classification workflow, the code generation system 106 may present such a car classification workflow to the user along with the set of visual tools that the user may use to further modify the car classification workflow. In some cases, the code generation system 106 may automatically configure the input brick to point to the folders specified by the user and any other bricks in the car classification workflow based on the information provided by the user.

In other embodiments, such a workflow creation request can be generated and/or submitted via a graphical user interface provided by an application on the user computing device 102 or by a remote server (e.g., a component of the code generation system 106), or via an application programming interface or a command line interface provided by a remote server (e.g., a component of the code generation system 106).

Figure 3A:
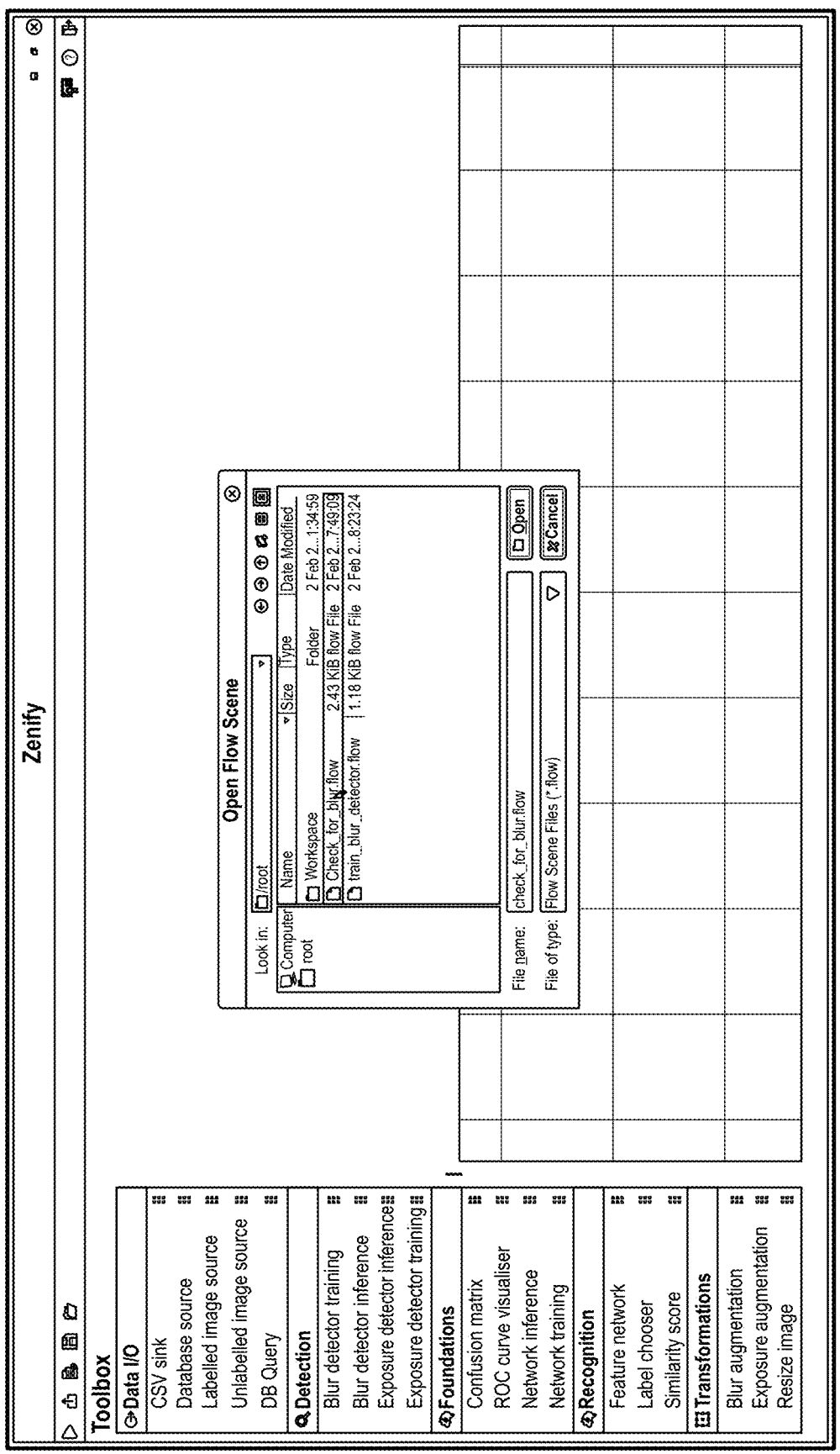
Figure 3B:
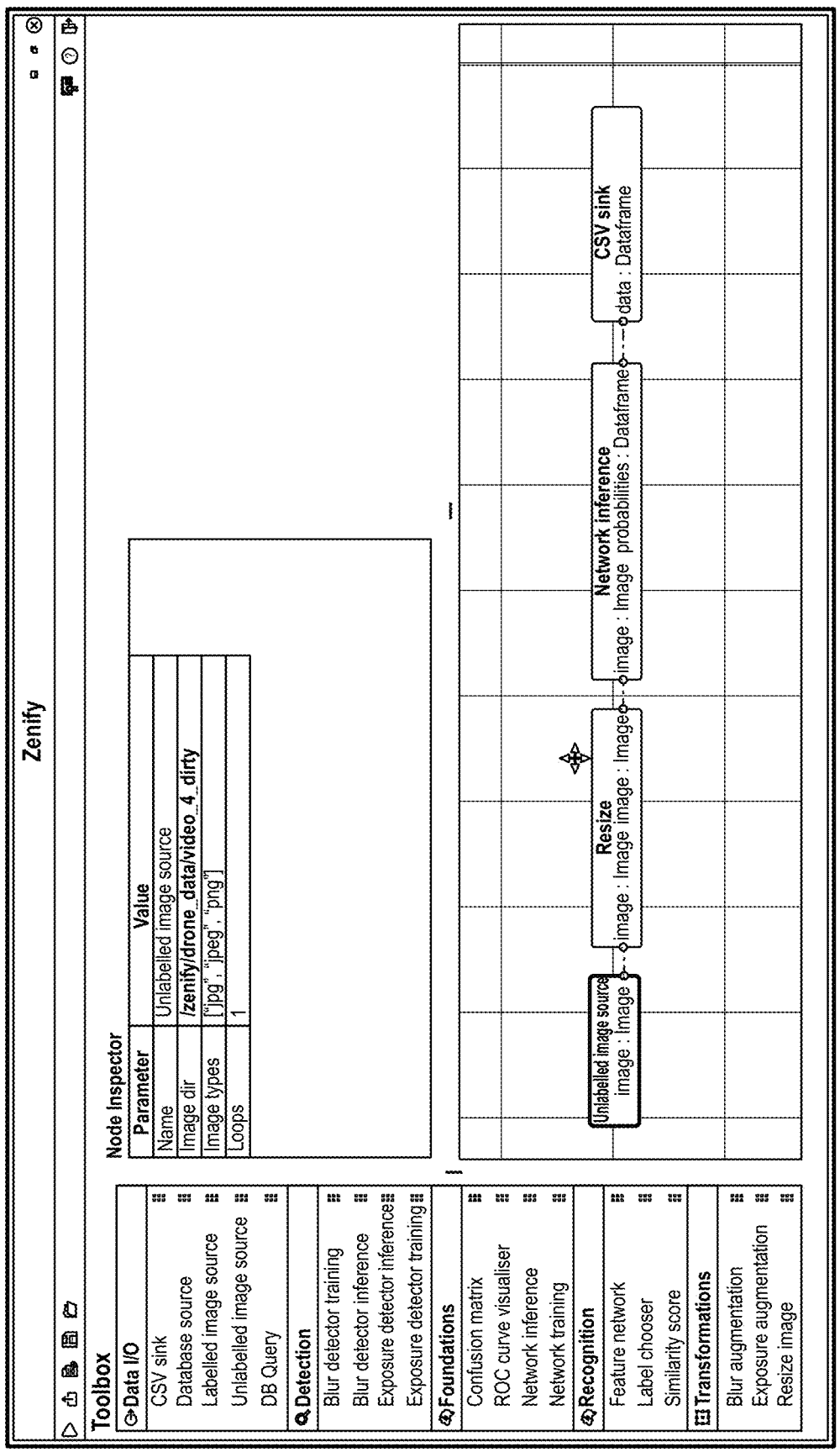
Figure 3C:
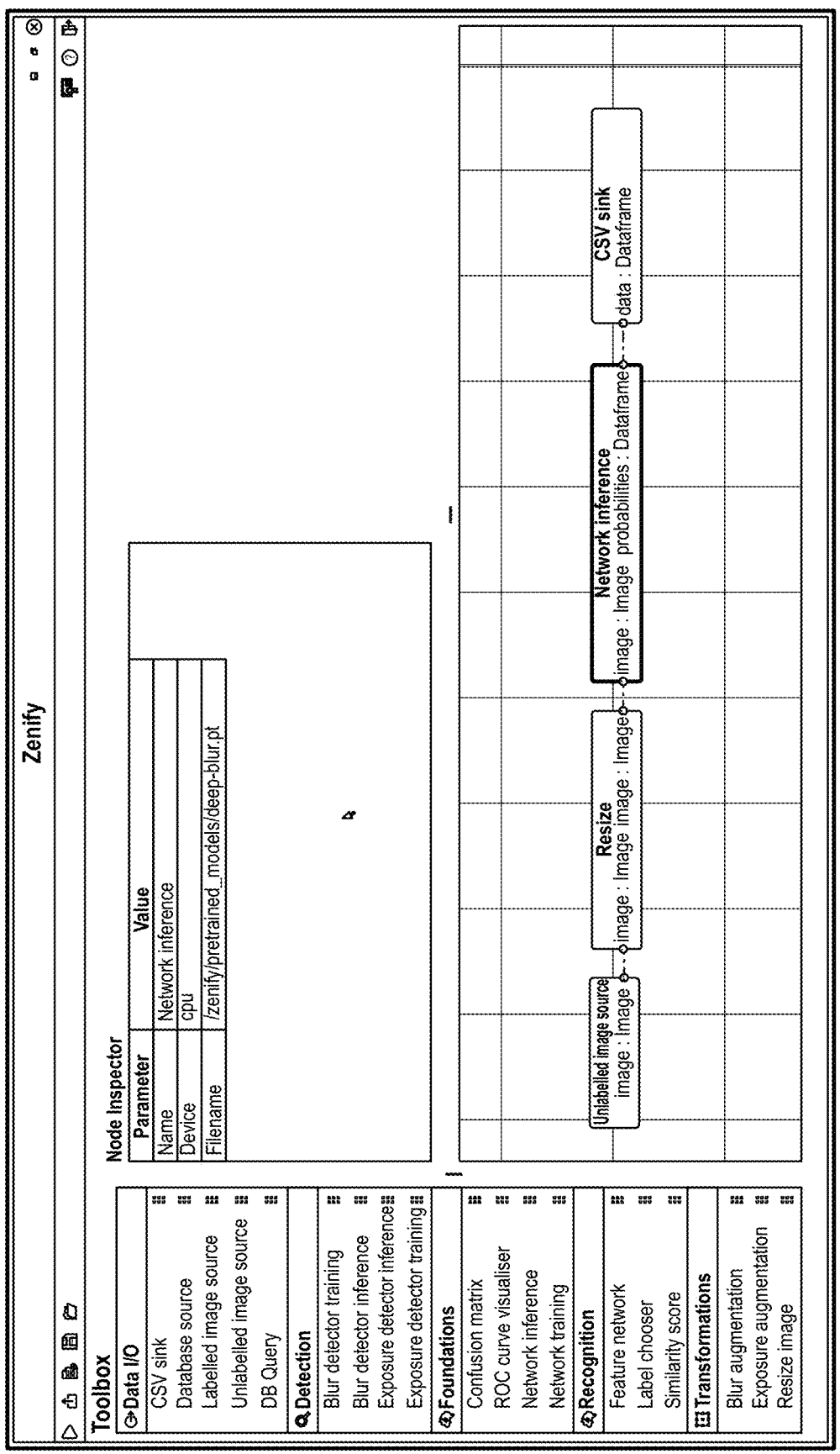
Figure 3D:
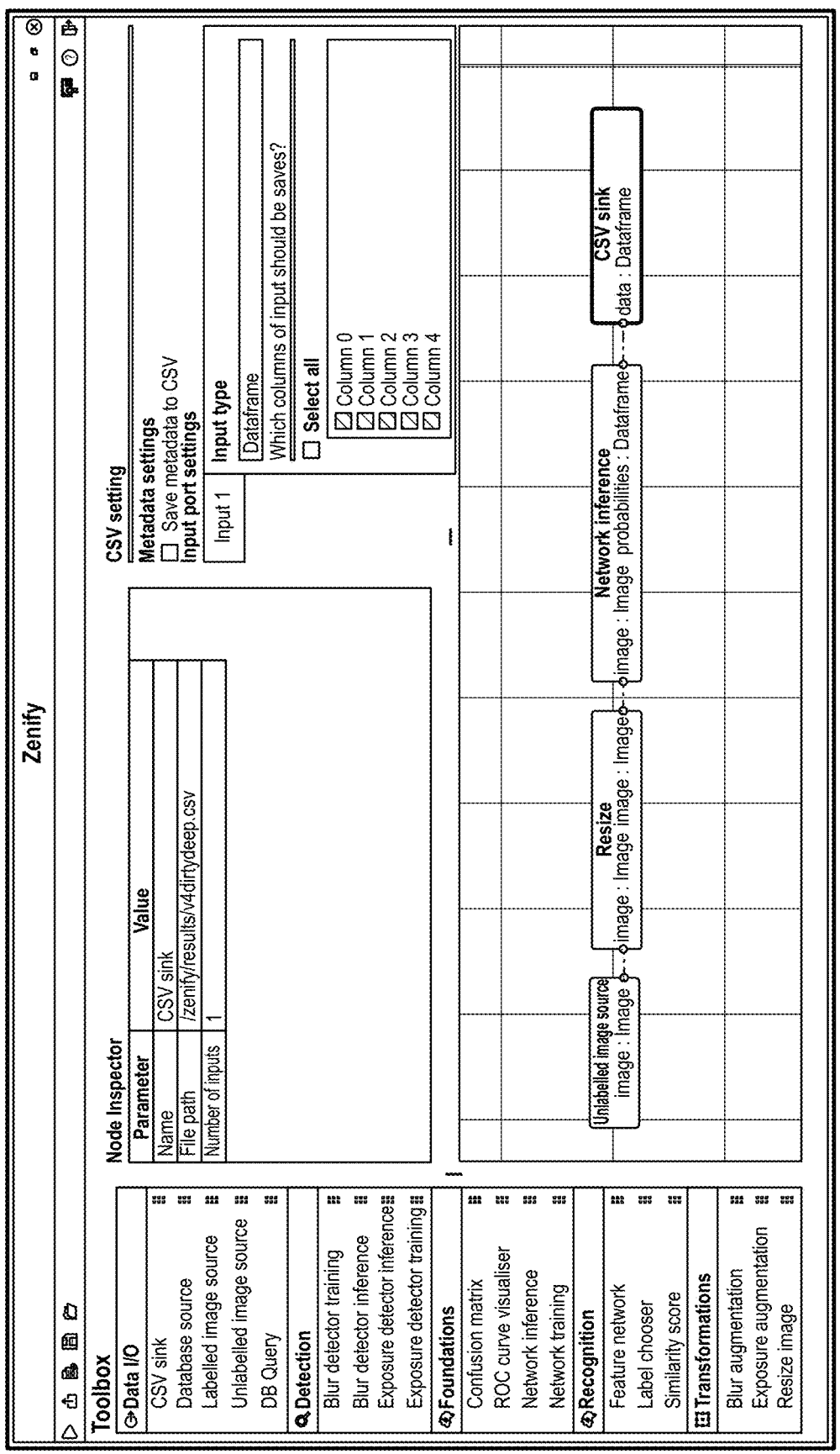
Figure 3E:
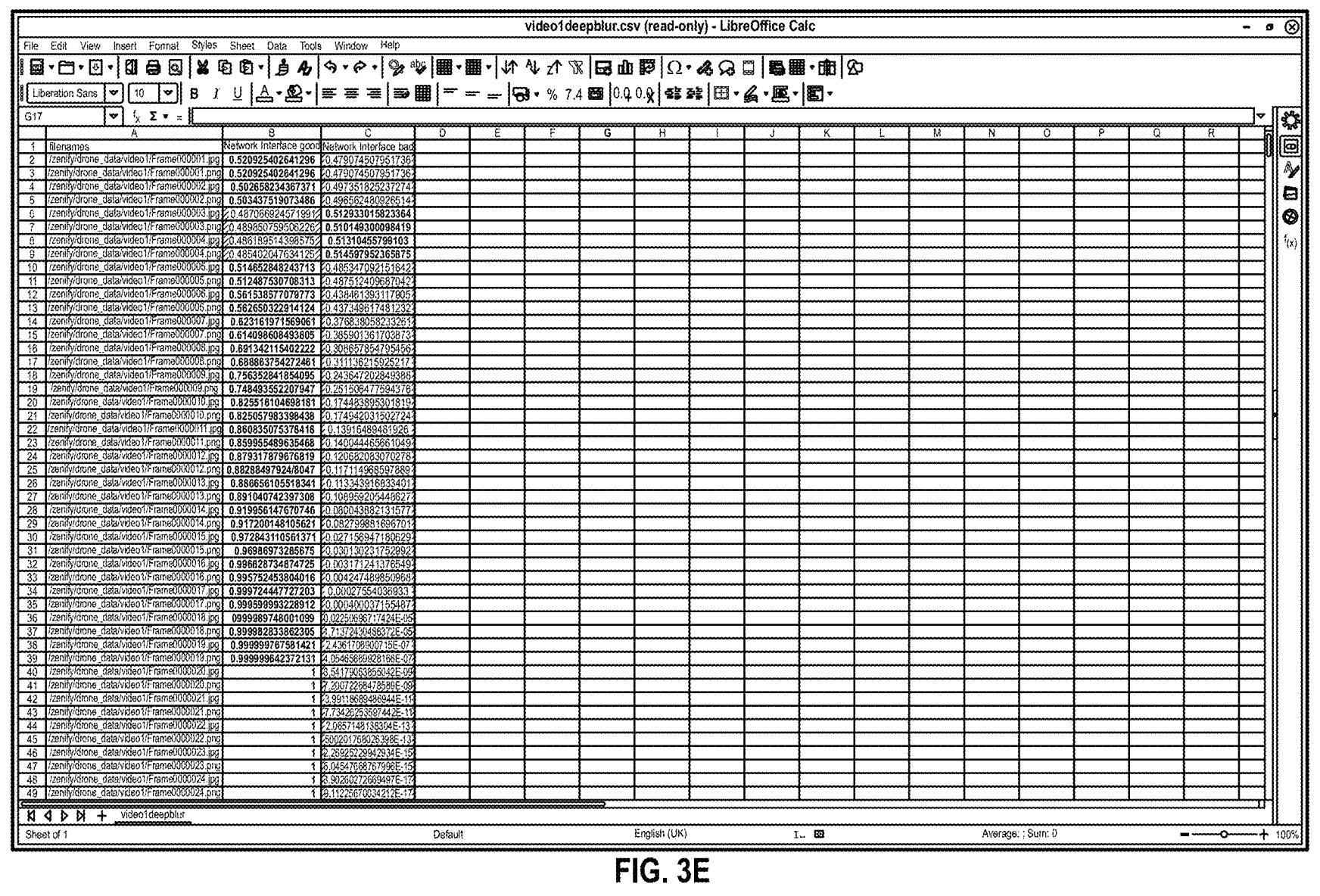
Figure 3F:
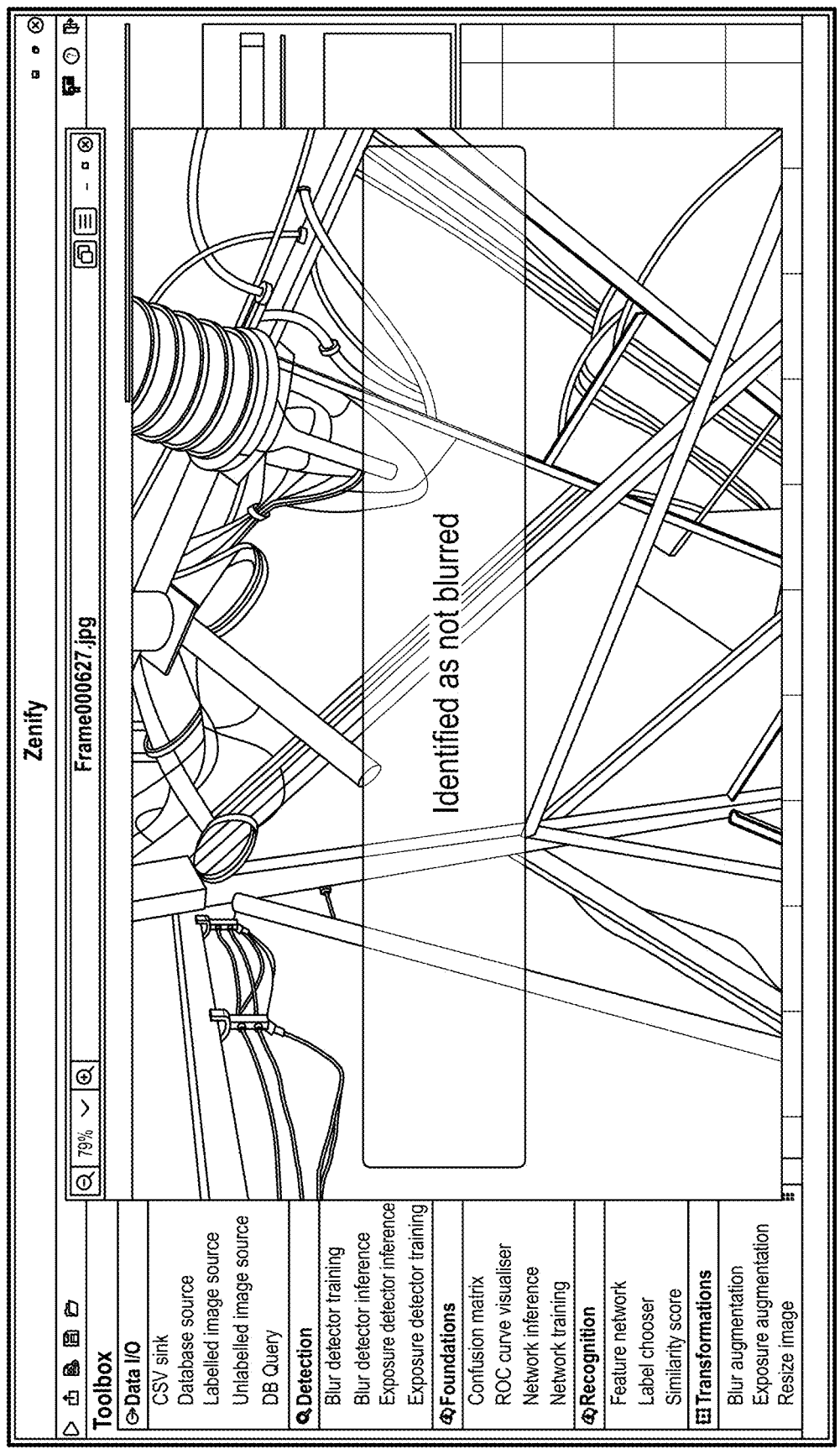
Figure 3G:
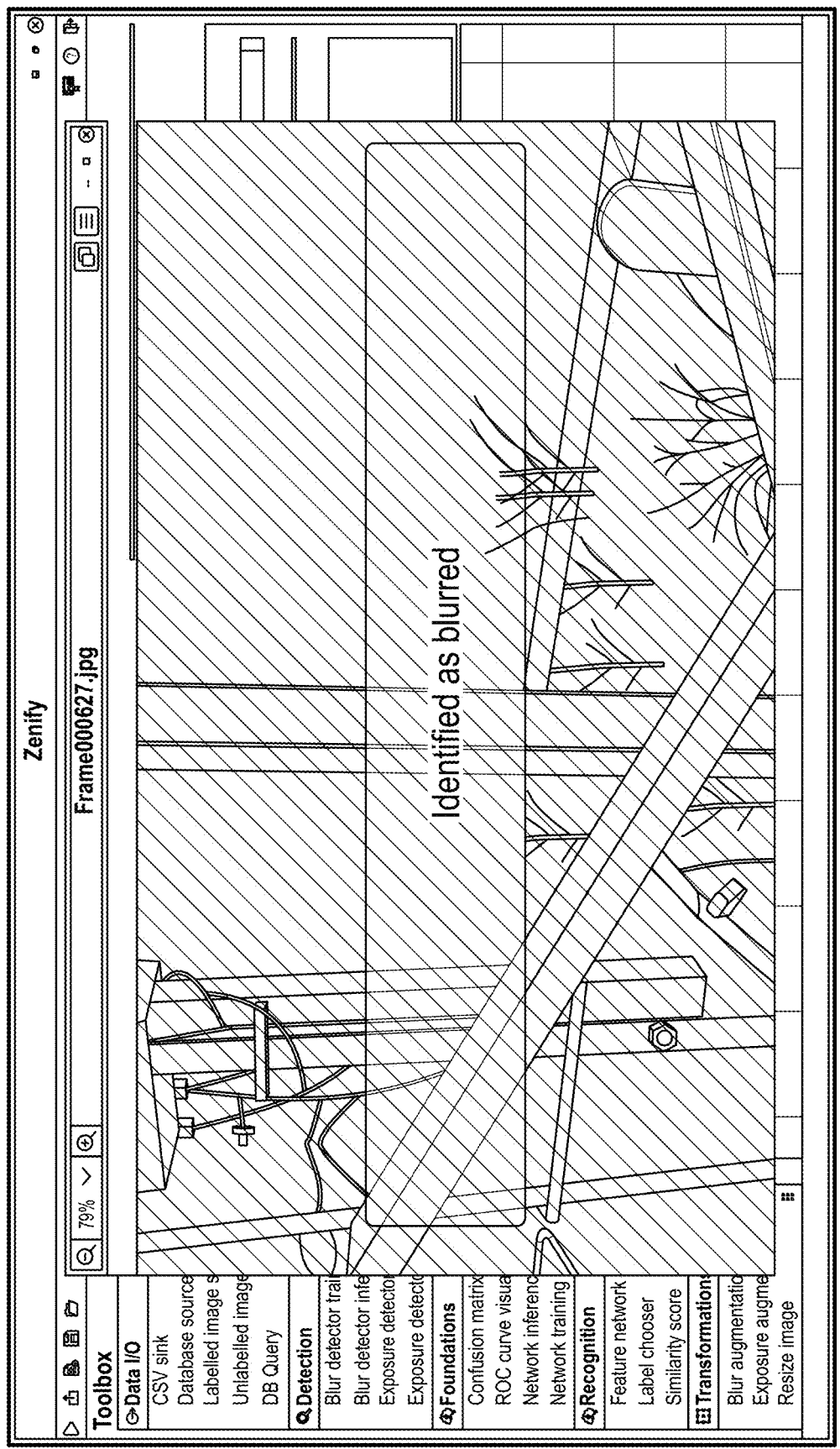
Figure 3H:
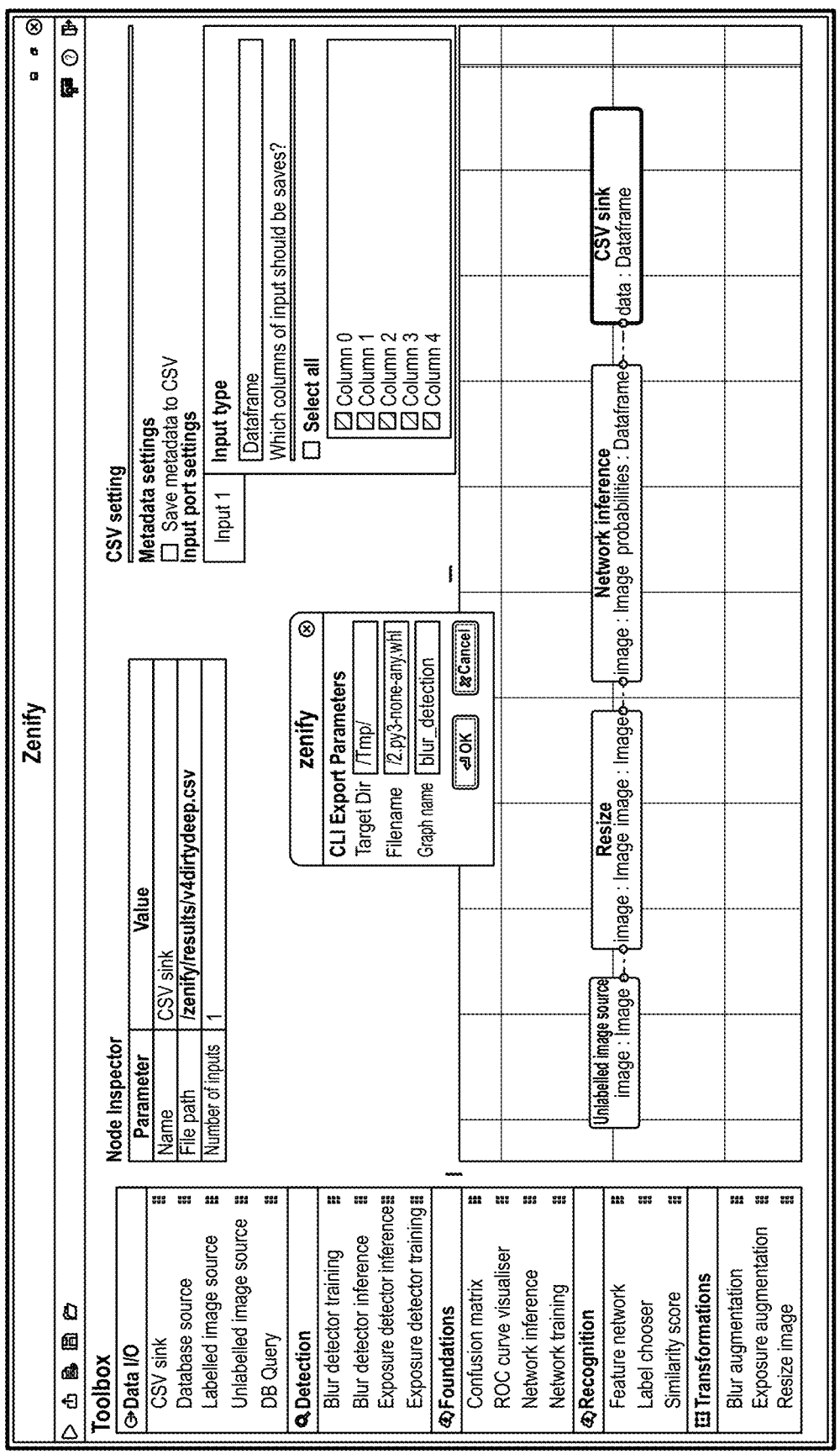
Figure 4:
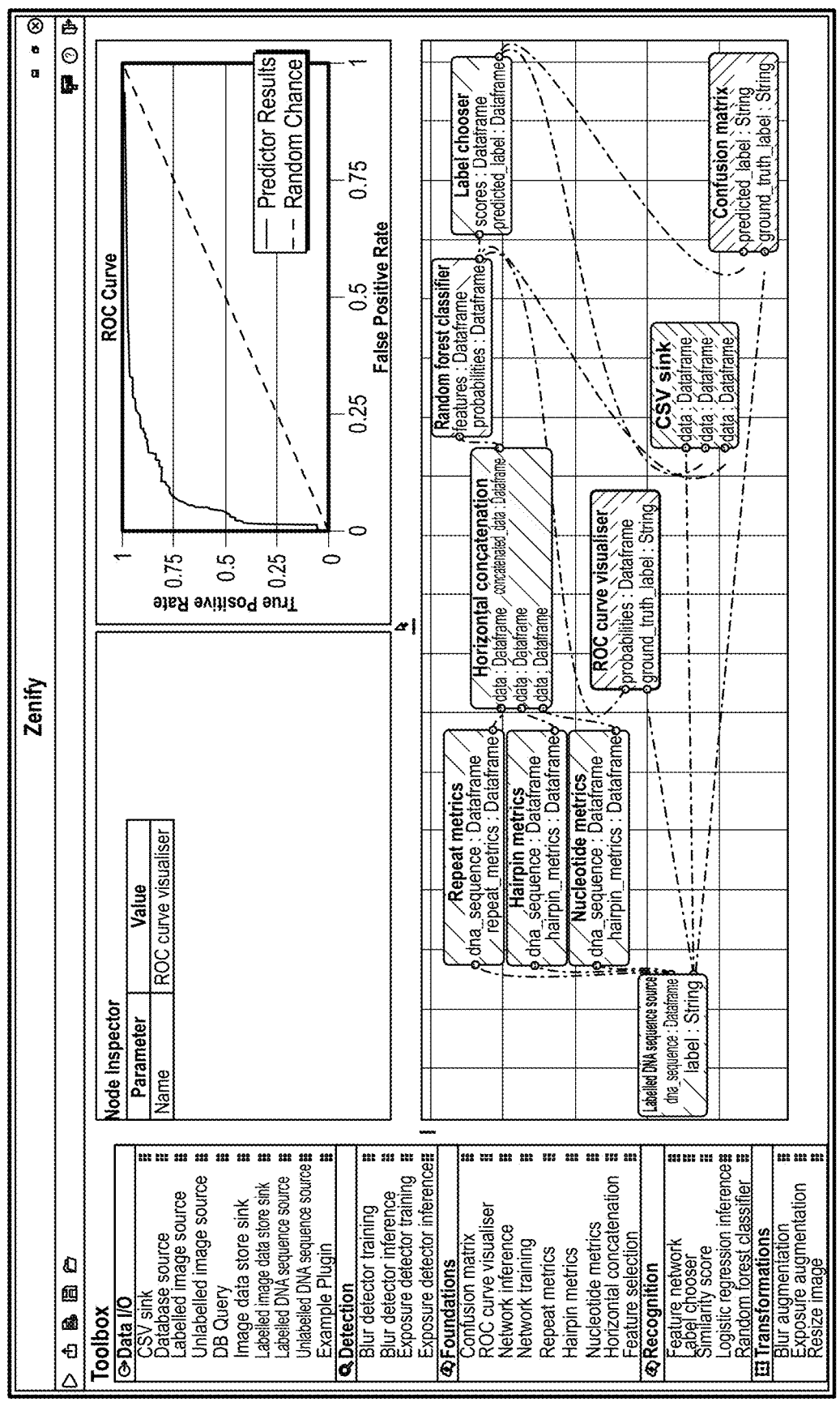
FIG. 4 is a user interface screenshot illustrating a plurality of user-manipulatable brick types usable to generate a customized workflow, in accordance with aspects of the present disclosure.

In some embodiments, the code generation system 106 allows the user to select from a list of computer vision or machine learning tasks (e.g., recognition task, retrieval task, detection task, segmentation task, regression task, etc.) and present an appropriate pre-generated workflow based on the user's selection, and the user may be able to further customize the pre-generated workflow using the visual tools provided to the user alongside the pre-generated workflow, as shown in FIGS. 2-4. In some cases, each of the categories (e.g., recognition task, retrieval task, detection task, segmentation task, regression task, etc.) may be associated with a workflow that includes at least one brick that is not present in another workflow associated with the other categories. For example, each of the categories may be associated with a workflow that includes a different machine learning model.

The code generation system 106 may provide a plurality of different types of workflows. For example, the code generation system 106 may provide pre-generated workflows (or allow the users to create user-customized workflows) for obtaining, labeling, and otherwise modifying data that can be used to train the machine learning models (which can then be used to build deployable software applications). These workflows may be referred to herein as data workflows. As another example, the code generation system 106 may provide pre-generated workflows (or allow the users to create user-customized workflows) for training machine learning models that can be used to build deployable software applications. These workflows may be referred to herein as training workflows. As yet another example, the code generation system 106 may provide pre-generated workflows (or allow the users to create user-customized workflows) for performing one or more desired tasks using one or more trained machine learning models, where such workflows can be deployed in a target environment as a software application for use by other users and applications. These workflows may be referred to herein as deployment workflows.

Data workflows can integrate with third-party data providers (real and/or synthetic) to obtain the required data. The code generation system 106 may use active learning (e.g., interactively querying a user to label new data points with the desired outputs) to select the best subset of data for human-in-the-loop labeling or to modify the existing data or generate additional data to achieve the best outcome (e.g., most accurate machine learning model) at a given budget (e.g., resources available for building the machine learning software solution). Such a process creates a unified data loop that may, in some cases, reduce the data cost by orders of magnitude.

The code generation system 106 may also allow the users to visualize their data, which can help identify one or more of the following problems: (i) class-imbalance problem (e.g., one specific category has only a single example/data point), (ii) noisy/outliers (e.g., some data points are mislabeled or a data point in the wrong category), (iii) redundant data (e.g., identical or very similar data points can be removed to increase training speed), and/or (iv) overall quality of clusters (e.g., which can be measured by determining how tight or spread out the clusters are and/or determining how much distance and/or overlap there is with other clusters). In response to identifying one or more of these issues, the code generation system 106 may send a notification to the user.

With the visualized data, the users may perform one or more of the following tasks with respect to their data points:
Point selection
Region selection
Point labelling
Region labelling
Point removal
Region removal
Merge clusters
Delete clusters
Recalculate results based on user action
Show layers of datasets (different data sets mapped to the same space) with varying level of clustering
Add data filters and coloring (e.g., color by class label, or automatic algorithms like HDBSCAN)
Support adding visualization layers with multiple coloring and filtering algorithms
Zoom in/out
Support undo
Hovering on data point shows original image data, or text sequence. It plays the sound if the data being shown in audio.

Once the user is satisfied with the quality of the data (e.g., by providing a user input to the code generation system 106) and/or the code generation system 106 determines that the overall cluster quality satisfies a condition, the code generation system 106 may proceed to the next stage (e.g., to use the data to train workflows).

Regarding noise removal, there may be several strategies that the code generation system 106 may adopt:

1. Before training—Before training begins, the code generation system 106 may remove noise under the assumption that noisy samples do not follow common patterns in the dataset or are redundant. Alternatively, the code generation system 106 may present visualizations of visualize the data to the user and interactively select some data points and remove them. With this step, the code generation system 106 may be able to reduce the dataset size by about 10%-20% hence improve speed of subsequent steps (e.g., training).

2. During training—The code generation system 106 may remove noisy data points gradually during training. First, the code generation system 106 may train a machine learning model. Then, the code generation system 106 may make certain predictions on the training dataset. Finally, if a given sample exceeds a threshold uncertainty level, such a sample may be removed or presented to the user for removal. The code generation system 106 can continue to monitor the training progress and the visualized data and remove additional data points as needed/desired.

3. During deployment—The code generation system 106 may use the machine learning model for prediction, and determine if a data point passes certain selection criteria. If the data point passes the selection criteria, the code generation system 106 may do nothing, but if the data point does not pass the selection criteria, the data point may be presented to the user as a confusable data point. The machine learning model can be re-trained with any modifications made to the dataset.

One or more techniques described herein (e.g., as being performed by the user computing device 106 or the code generation system 106 or any component(s) thereof) can be performed by a mobile application installed on the user computing device 102 and/or a browser application in communication with a remote server over the network 104.

The code generation system 106 is depicted in FIG. 1 as operating in a distributed computing environment including several computer systems that are interconnected using one or more computer networks. The code generation system 106 could also operate within a computing environment having a fewer or greater number of devices than are illustrated in FIG. 1. Thus, the depiction of code generation system 106 in FIG. 1 should be taken as illustrative and not limiting to the present disclosure. For example, the code generation system 106 or various constituents thereof could implement various Web services components, hosted or "cloud" computing environments, and/or peer-to-peer network configurations to implement at least a portion of the processes described herein.

Further, the code generation system 106 and its components may be implemented in hardware and/or software and may, for example, include one or more physical or virtual servers implemented on physical computer hardware configured to execute computer executable instructions for implementing the various features described herein. In some embodiments, one or more of the components shown in FIG. 1 may be implemented on one or more virtual servers or virtual machines.

Moreover, the processing of the various components or services of the code generation system 106 can be distributed across multiple machines, networks, or other computing resources. The various components or services of the code generation system 106 can also be implemented in one or more virtual machines or hosted computing environment (for example, "cloud") resources, rather than in dedicated servers. Likewise, the data repositories shown can represent local and/or remote, physical and/or logical data storage, including, for example, storage area networks or other distributed storage systems. In some embodiments, the connections between the components or services shown represent possible paths of data flow, rather than actual connections between hardware. While some examples of possible connections are shown, any subset of the components shown can communicate with any other subset of components in various implementations. Executable code modules that implement various functionalities of the code generation system 106 can be stored in the memories of the user computing devices 102, the servers 120, and/or on other types of non-transitory computer-readable storage media associated with one or more of the components shown in FIG. 1 or one or more other components not shown in FIG. 1.

Example Process of Creating a Customized Workflow

FIGS. 2A-2G depict user interface screenshots illustrating an example process of creating a customized workflow, in accordance with aspects of the present disclosure. More specifically, in FIGS. 2A-2G, an example process of creating a workflow for training a machine learning model for detecting blurred images is illustrated.

Figure 2A:
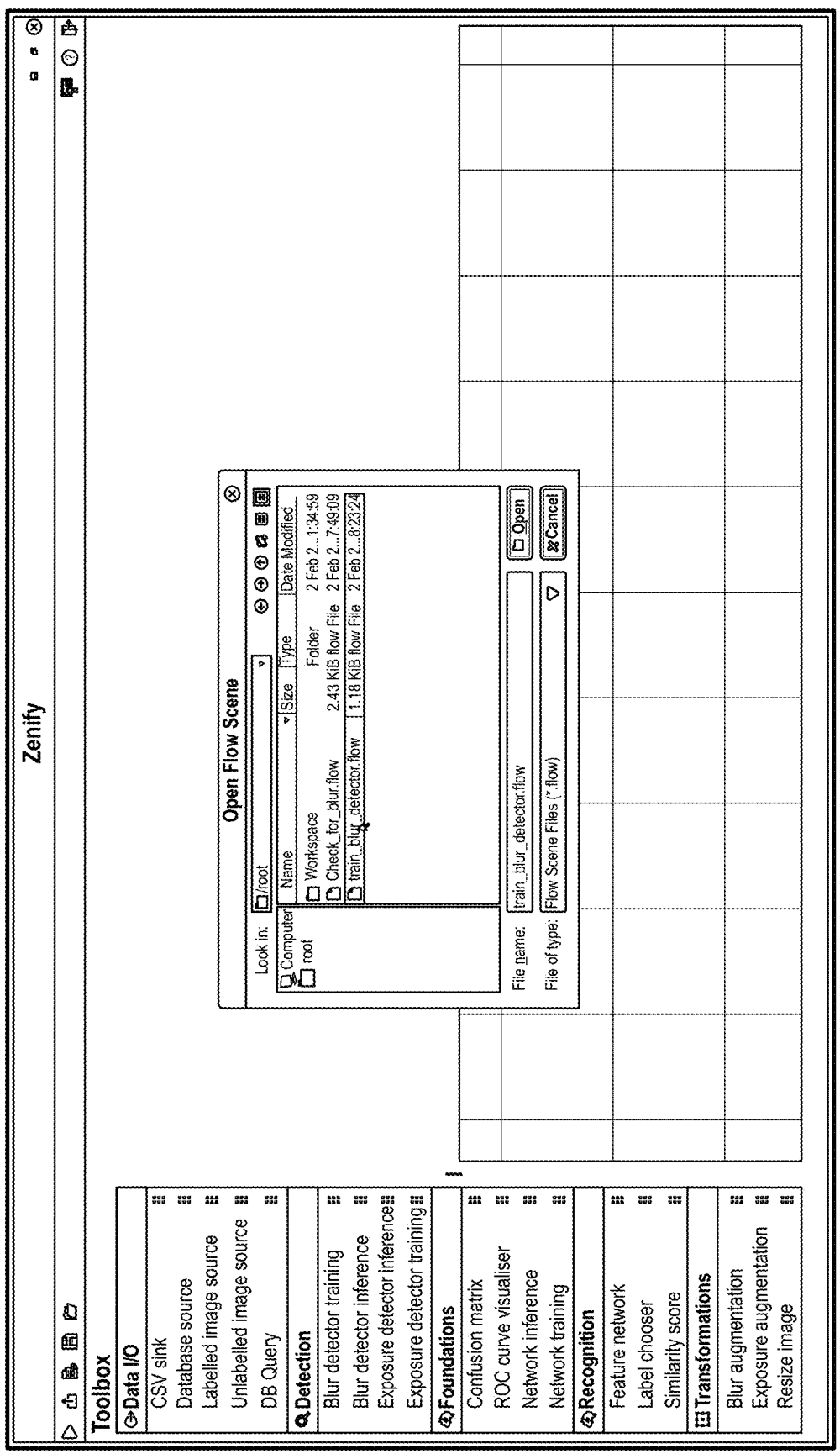
FIGS. 2A-2G depict user interface screenshots illustrating an example process of creating a customized workflow, in accordance with aspects of the present disclosure.

FIG. 2A shows an interactive graphical user interface (also referred to herein as workflow modification user interface) that is presented to the user on the user computing device 102 (e.g., by the code generation system 106), which includes (i) a toolbox on the left side of the screen including a plurality of tools that can be used to customize a workflow, (ii) a working area on the bottom half of the screen where the user can manipulate the various tools provided by the code generation system 106 to customize the workflow, and (iii) information area on the top half of the screen where information relevant to the workflow (such as configuration parameters for a selected tool or brick or visualization data indicative of the performance of the workflow) may be presented. In FIG. 2A, the user is loading a pre-generated workflow that can be used to train a machine learning model for detecting blurred images.

Figure 2B:
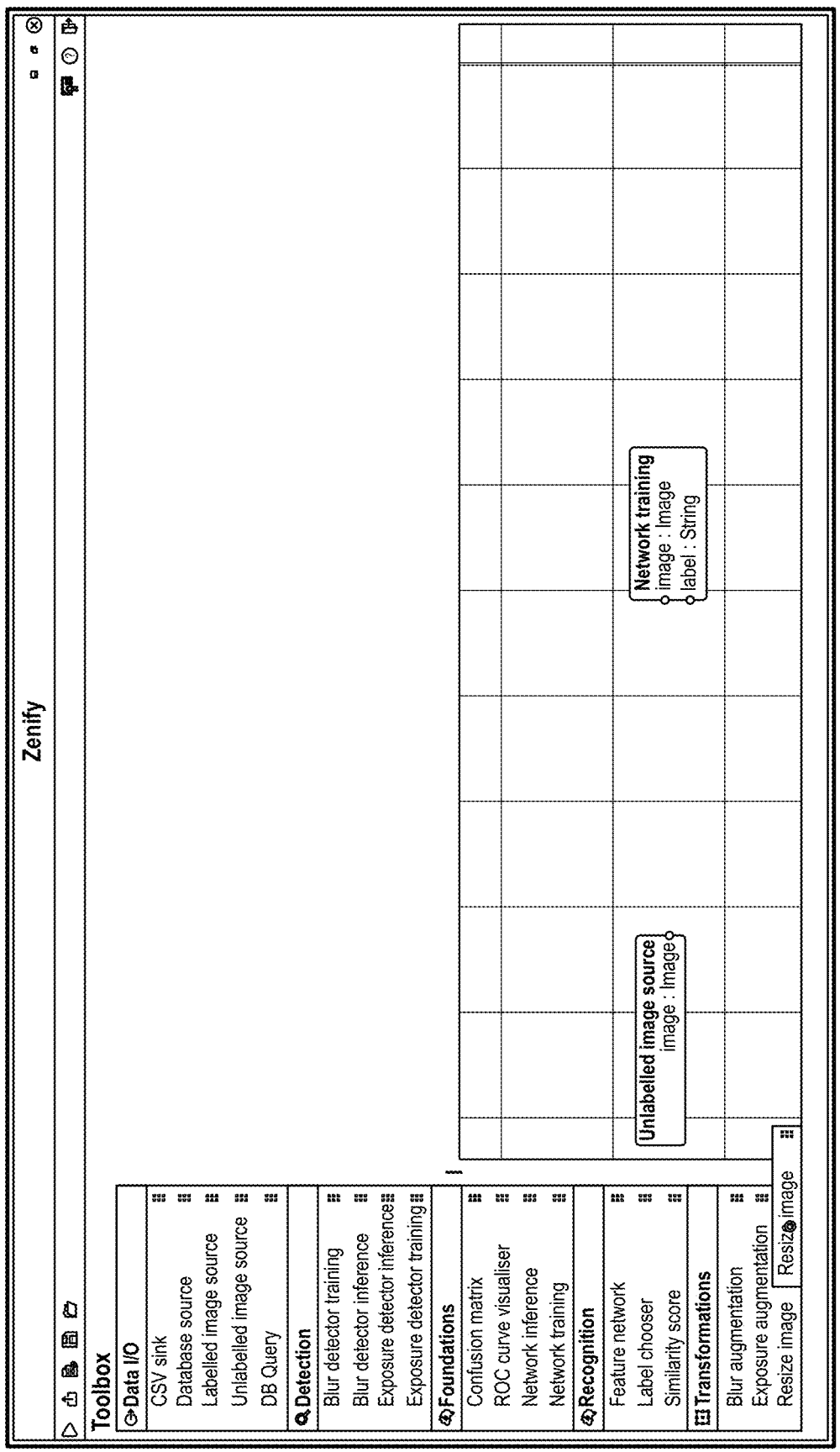

In the example of FIG. 2B, the pre-configured (or pre-generated) workflow loaded into the working area of the workflow modification user interface includes (i) an "unlabeled image source" brick configured to (or configurable by the user to) provide, to the rest of the workflow, a set of images to be processed, transformed, analyzed, and/or visualized, and (ii) a "network training" brick that is associated with a trainable machine learning model.

As shown in FIG. 2B, the user can drag, using an input device such as a mouse or touchpad, the "resize image" brick from the toolbox on the left side of the user interface over to the working area of the user interface and drop the brick in a location convenient for the brick to be connected to the remaining bricks of the workflow (e.g., between the "unlabeled image source" brick configured to output images to be resized, and the "network training" brick configured to receive resized images as input). The unlabeled image source brick also indicates that the data type of the output data being output through the output port is an image (or a set of images), and the network training brick indicates that the data types of the input data that the brick can receive via its input ports, respectively, are images ("image") and strings ("label").

Figure 2C:
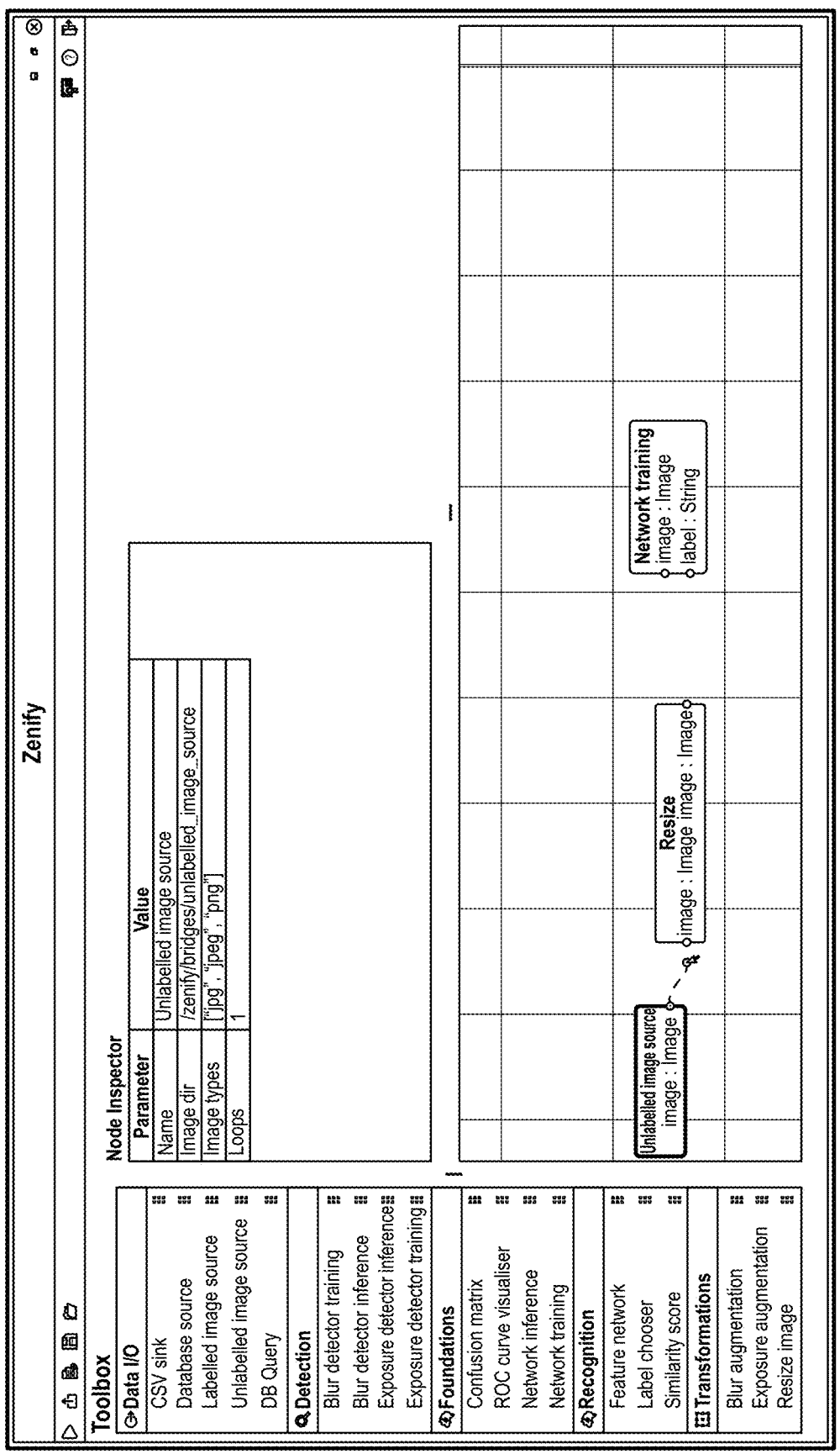
Figure 2D:
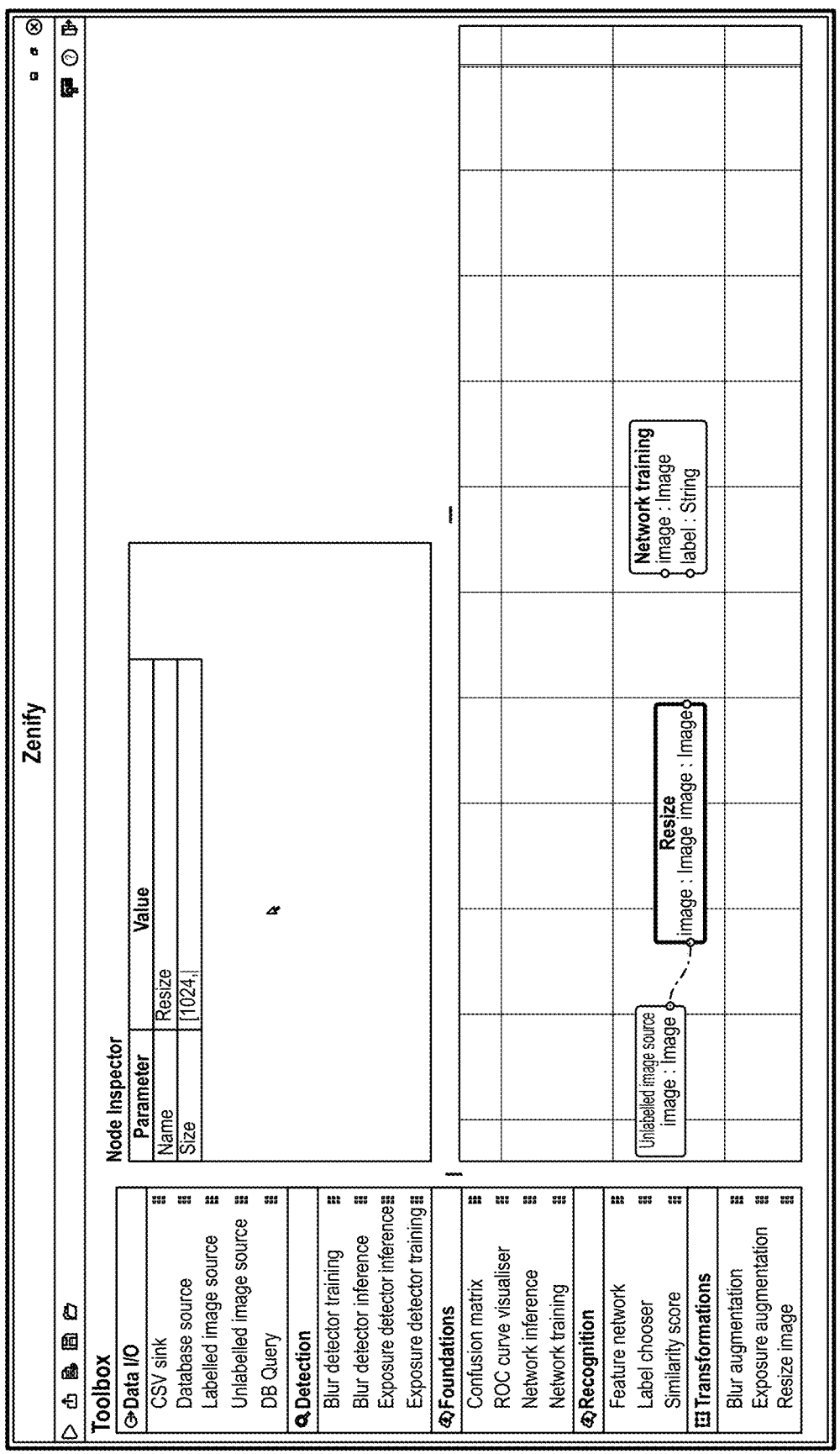

FIG. 2C shows how the resize brick that has been added to the working area can be connected to the other bricks in the workflow. As shown in FIG. 2C, the user can click on the output port of the unlabeled image source brick and drag the cursor over to the input port of the resize brick. FIG. 2C also shows that certain information or parameters of a brick can be displayed in the information area when the brick has been selected by the user. FIG. 2D shows the connection between the two bricks after the connection has been established.

As described with reference to FIGS. 2C and 2D, when the user moves the cursor to an output port of a brick and clicks on the output port, the graphical user interface allows the user to be able to drag the cursor to an input port of another brick and let go of the cursor to connect the output port to the input port. In some embodiments, in response to the user clicking on an output port, the code generation system 106 may cause one or more input ports of the bricks shown in the workflow modification user interface that are configured to accept the type of data outputted by the output port to be highlighted, such that the user can easily distinguish the input ports to which the user can connect the output port from the input ports to which the user cannot connect the output port. In some embodiments, in response to the user letting go of the cursor at the selected/desired input port, the code generation system 106 may determine whether the input port is configured to (or allowed to) accept the output data outputted by the output port (e.g., by determining the data type associated with the output port, accessing the list of accepted input data types associated with the input port, and determining whether the data type is included in the list of accepted input data types). If the input port is configured to accept the output data type, a connection may be provided between the output port and the input port. If not, the connection requested by the user may be rejected and/or a connection may not be provided between the output port and the input port.

In some embodiments, an output port may be configured to output one of two or more data types. For example, the data type of the output data outputted by the output port of a brick may depend on the data type of the input data received by the brick (e.g., if the brick receives image data, the brick may output image data, and if the brick receives a string, the brick may output a string). In such embodiments, the code generation system 106 may determine the input data type of the input data being fed into the brick, determine the output data type of the output data based on the determined input data type, and use the output data type to determine whether the input port of another brick to which the user is requesting to connect the output port can accept data in the determined output data type. In some cases, the code generation system 106 may need to continue to move upstream all the way to the initial input I/O brick in order to determine the output data type of the current brick that the user is attempting to connect to another brick (e.g., identify the brick immediately upstream of the current one, then identify the brick immediately upstream of that brick, and so on).

In other embodiments, the output port may be configured to output multiple data types. For example, the output port of a first brick may be configured to output, when given images as input, (i) images if the input port of a second brick to which the output port of the first brick is being connected is configured to accept images, or (ii) a comma-separated values (CSV) file if the input port of the second brick to which the output port of the first brick is being connected does not accept images but is configured to accept CSV files. In such cases, the code generation system 106 may determine whether at least one of the output data types that can be outputted by the first brick is also accepted by the second brick, and if so, cause the output port of the first brick and the input port of the second brick to be connected (and if not, reject the connection request).

Although this example is described as the user starting at an output port and dragging the cursor to an input port, in some embodiments, the user performs the reverse, starting at an input port and dragging the cursor to an output port to connect the two ports. The process may be similar to that described above (with "input" and "output" switched).

Figure 2E:
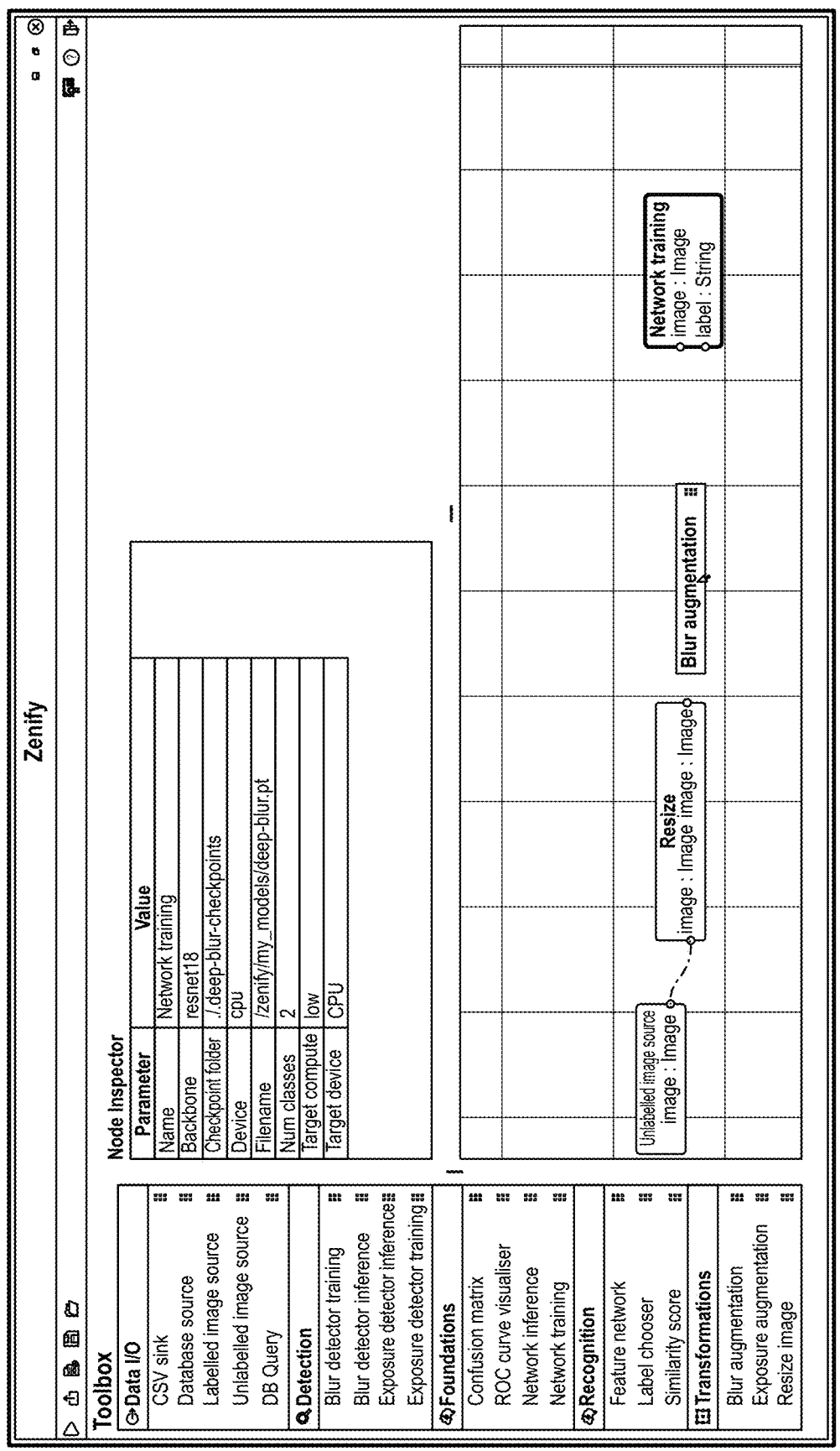
Figure 2F:
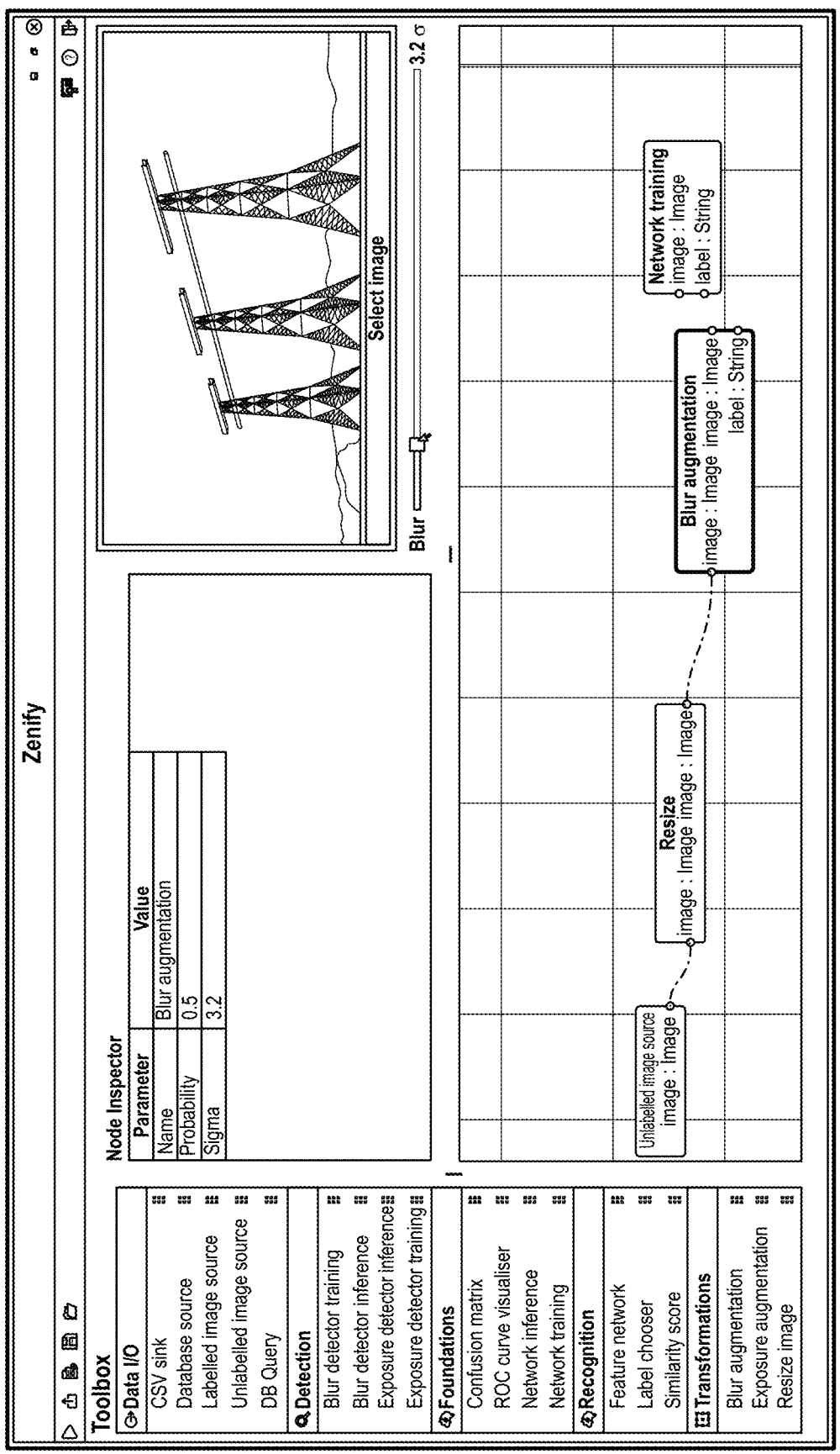

As shown in FIG. 2E, one or more additional bricks can be added to the working area to further customize the workflow. Here, the blur augmentation brick is being added to generate input data that can be used to train the machine learning model associated with the network training brick. As shown in FIG. 2F, the added brick can be further configured by clicking on the brick and adjusting the parameters in the information area of the workflow modification user interface. Here, the blur levels are being adjusted by the user.

Figure 2G:
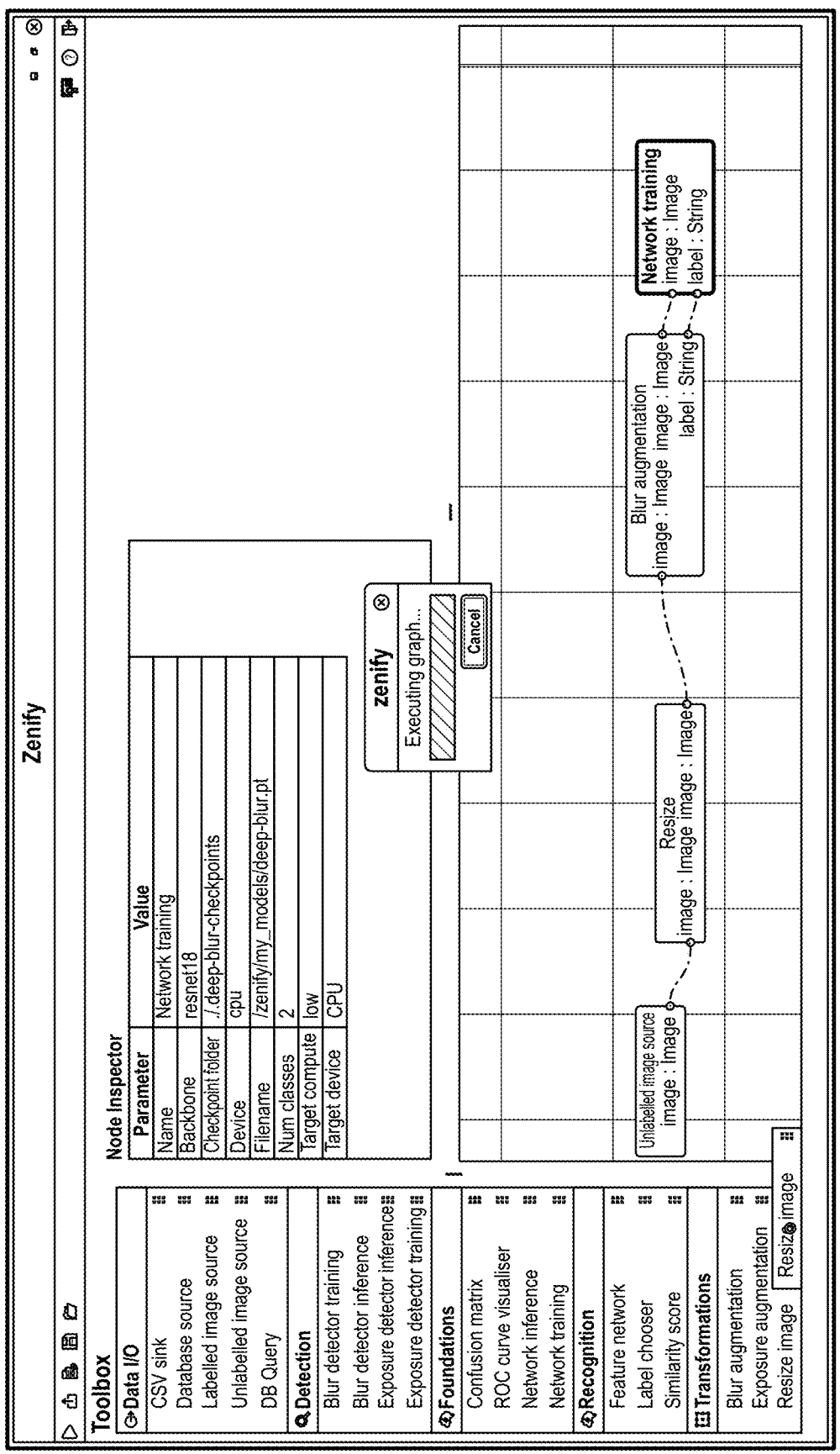

FIG. 2G shows the code generation system 106 executing the finished training workflow. Executing the workflow would train the machine learning model associated with the network training brick using the images loaded by the unlabeled image source brick, resized by the resize brick, and blurred and labeled by the blur augmentation brick. As further described below with reference to FIGS. 3A-3H, the trained machine learning model can be used to build a blur detection solution (e.g., with or without additional optional testing or re-training).

In some embodiments, training is performed according to one or more of the techniques described herein on a single device or a single system. In other embodiments, such training can be performed in a distributed manner across multiple devices or systems. For example, the code generation system 106, via its heterogeneous compute abstraction layer, may connect to and manage various computing resources that may be available on the user computing devices 102, locally in the user's network environment including the user computing devices 102, remotely over a network, and/or in the cloud. The computing resources described herein can include one or more units of central processing unit (CPU), graphics processing unit (GPU), field-programmable gate array (FPGA), digital signal processor (DSP), application-specific integrated circuit (ASIC), disk, storage, memory, network bandwidth, and/or virtual or physical machines that can be used to generate, test, and/or improve the machine learning software solution and/or to execute the machine learning software solution in the target environment.

In some embodiments, the location in which building, testing, training, execution, and/or deployment take place may vary. For example, one or more workflows may be built and trained on the user's machine but deployed onto a cloud server. As another example, one or more workflows may be built and trained on a cloud server (e.g., via a workflow modification user interface provided on the user's machine), and deployed on a machine in the user's local area network. Any other combinations of such locations may be implemented.

The code generation system 106 may decide to divide up the training (or the computations for the training) into multiple portions based on the type and amount of computing resources available to be used for the training. For example, if the code generation system 106 has two machines (which may be virtual or physical) available for training, where the bandwidth associated with the first machine is a lot higher than that associated with the second machine (e.g., the first machine may be local to the code generation system 106 and the second machine may be remotely located from the code generation system 106), the code generation system 106 may instruct the first machine to perform a subset of the training tasks that involves relatively large data sizes, and instruct the second machine to perform the remaining subset of the training tasks that involves relatively small data sizes to minimize the amount of data transfer between the code generation system 106 and the second machine. As another example, if the first machine has a relatively large amount of CPU capacity and the second machine has a relatively small amount of CPU capacity, the code generation system 106 may instruct the first machine to perform a subset of the training tasks that uses a relatively large amount of processing power, and instruct the second machine to perform the remaining subset of the training tasks that uses a relatively small amount of processing power to efficiently use the available computing resources. The code generation system 106 may divide up the training tasks in a way that optimizes for any combination of variables including training time, computing resource used for training, machine learning mode accuracy, computing resource used for execution, etc. (e.g., based on an indication of the user's preferences and/or according to default training/optimization rules). Although distributing the training tasks is described in these examples, any other workflows (such as data workflows or deployment workflows) described herein may be performed by a single device/system, or across multiple devices/systems.

In some embodiments, the code generation system 106 may allow the user to choose to run the training workflow using a central system or a distributed system, or serially, or in parallel. To facilitate the execution of the training workflow in a distributed fashion, the code generation system 106 may process the data (e.g., using the data workflows described herein) and provide independent and identically distributed (IID) data for all connected computing components usable for performing one or more of the training tasks in the training workflow.

The code generation system 106 may automatically distribute training/testing and/or data workflows for high-performance execution on a private network and/or a public cloud network. The three main modes of distribution include: (a) workflow parallel mode—where whole workflows are distributed for data-parallel execution; (b) brick parallel mode—where the workflow graph is divided across computing resources for model-parallel execution; and (c) a combination of workflow-parallel training/testing/execution and brick-parallel training/testing/execution.

The code generation system 106 may, at runtime, automatically distribute a training on a single workstation, a network of workstations/servers, and/or the cloud. To do so, the code generation system 106 may analyze each individual training workflow in the software solution for:

Memory requirements
Device compatibility
Speed
Compute budget (in case of using cloud resources or time-sharing private resources)

Based on the above factors, the code generation system 106 may choose one of the following plans for distributed training:

Workflow Parallel—The whole training workflow is replicated on each compute node (e.g., physical machines, virtual machines, etc.) available for use. The data may be partitioned into each node by the ratio of throughputs, and the data may be independent and identically distributed. The code generation system 106 may designate one of the nodes as a central node, and the central node may gather all the results from the remaining nodes and update the machine learning model(s) being trained.

Brick Parallel—If whole workflows cannot fit into the memory of a single node (or if brick-level distribution would result in superior training results), then the bricks are distributed among the nodes. The code generation system 106 may calculate the optimal distribution based on a cost matrix calculated by weighting speed gain vs. data transmission latency.

Combination—In heterogeneous scenarios in which computing resource capabilities vary, the code generation system 106 may choose a combination of the above two plans for an optimal distribution.

In some embodiments, the code generation system 106 may analyze the dependencies of the training tasks that need to be performed (e.g., based on how the bricks and/or workflows are connected to each other), and cause some or all of the tasks to be performed in series, and/or some or all of the tasks to be preformed in parallel. In some cases, whether the tasks are performed serially or parallelly may depend on whether the corresponding bricks or workflows are connected serially or parallelly.

Example Process of Executing, Visualizing, and Deploying a Customized Workflow

FIGS. 3A-3H depict user interface screenshots illustrating an example process of executing a customized workflow, visualizing the result of the execution, and deploying the customized workflow, in accordance with aspects of the present disclosure. More specifically, in FIGS. 3A-3H, an example process of loading a pre-configured workflow for detecting blurred images and further customizing, executing, visualizing, and deploying the workflow is illustrated.

As shown in FIG. 3A, a user can select a pre-generated workflow and load it into the working area for further customization. The pre-generated workflow may be provided by the code generation system 106 as one of a plurality of default workflows, or previously configured and saved by the user.

As shown in FIG. 3B, the pre-generated workflow may include the "unlabeled image source" brick usable to define the input data, the "resize" brick usable to resize the input images, the "network training" brick, which includes the machine learning model previously trained by the user (e.g., in FIGS. 2A-2G) or pre-trained by the code generation system 106, and the "CSV sink" brick usable to save the results of the operation (e.g., blur detection) performed by the workflow to a destination location. As shown in FIGS. 3C and 3D, the individual bricks can be selected to view additional information and configure any parameters for the selected bricks.

FIG. 3E shows the raw data generated by the machine learning model (e.g., probability that a given image is blurred or not blurred). FIGS. 3F and 3G show how each input image in the input image data can be displayed along with a visual indication of the classification result corresponding to the input image. In this example, the code generation system 106 can display the series of images (e.g., as a continuous video or as a discrete set of slides) with the visual indications superimposed thereon, as shown in FIGS. 3F and 3G.

Essentially, FIGS. 3A-3H illustrate the manner in which the user can load a pre-configured workflow (e.g., as shown in FIG. 3A), upload the user's desired input data (e.g., by configuring the first brick in FIG. 3B), and define the user's desired output data (e.g., by configuring the fourth brick in FIG. 3D), and have a complete machine learning application ready for execution, visualization, and/or deployment.

Example User-Manipulatable Brick Types

FIG. 4 is a user interface screenshot illustrating a plurality of user-manipulatable brick types usable to generate a customized workflow, in accordance with aspects of the present disclosure.

Some example brick types include (i) an I/O brick type, which can be used to read or write data, (ii) a transform brick type, which can be used to transform or manipulate data, (iii) an evaluation brick type, which can be used to train, test, or visualize input/output data or execution results, and (iv) a learnable brick type, which can be used to perform machine learning tasks.

For example, a workflow may include an I/O brick that is a video reader. The user can configure the brick with the path to the video data and outputs the frames from the video read at the path. For each frame, the workflow may include a transform brick that takes the frame and resizes the frame to the input size of a neural network associated with a learnable brick in the workflow. The learnable brick can be pre-trained and provided to the user, or the user may have pre-trained the learnable brick prior to including it in the workflow. For example, the learnable brick may output bounding boxes indicating the location of a detected feature in the frames. The output of the learnable brick can then be fed into another transform brick that takes the bounding boxes and scales them back to the original image dimensions. Then, another transform brick may take both the scaled back bounding boxes and the original images and draws the bounding boxes on the images. This output can then be fed into another I/O brick to be written to a storage location as another video file.

Referring now to the example of FIG. 4, (i) the "Labelled DNA sequence source" brick and the "CSV sink" brick are of the I/O brick type (also referred to herein as I/O bricks), (ii) the "Repeat metrics" brick, "Hairpin metrics" brick, and "Nucleotide metrics" brick, "Horizontal concatenation" brick, and "Label chooser" brick are of the transform brick type (also referred to herein as transform bricks), (iii) the "Random forest classifier" brick is of the learnable or trainable brick type (also referred to herein as a learnable brick or a trainable brick), and (iv) the "ROC curve visualizer" brick and "Confusion matrix" brick are of the evaluation brick type (also referred to herein as evaluation bricks). The operation of the workflow shown in FIG. 4 is described in greater detail below with reference to FIG. 8.

As shown in FIG. 4, different types of bricks may include visually distinguishing features (e.g., in the toolbox area on the left side of the screen in FIG. 4, and/or in the working area on the bottom half of the screen in FIG. 4). For example, each brick type may have a different color, shading, outline, border weight, shape, graphical icon, and/or visual indicator.

In some embodiments, a single workflow may include one or more I/O bricks, one or more transform bricks, one or more evaluation bricks, and/or one or more learnable bricks (e.g., each associated with a different machine learning model). For example, a user may load a pre-generated workflow that relates to feature detection. Such a workflow may include an input I/O brick that can be configured by the user to specify a folder storing a set of images to be used as input data. The user may then add a transform brick (or configure an existing one included in the pre-generated workflow) for resizing the input images and configure the resizing parameters. The user may then connect the output port of the transform brick to the input port of a learnable brick associated with a machine learning model (e.g., pre-trained to detect cars) usable to detect features in the input images. The feature detection results can be outputted to a destination using an output I/O brick.

Additionally, the user can feed the input images from the input I/O brick to another transform brick to crop the input images, and connect the output port of the transform brick to the input port of another brick associated with another machine learning model (e.g., pre-trained to detect traffic lights) usable to detect different features in the input images. The feature detection results of that learnable brick can be outputted to a destination using the same output I/O brick as used before or another output I/O brick configured to store the results to a different destination. This process can be repeated to add additional tasks to the workflow.

In some embodiments, the toolbox shown in FIG. 4 may include a fewer number of tools (e.g., a subset of those shown FIG. 4 determined based on the user's indication of a specific task, where different user indications result in different subsets of tools being presented) or a greater number of tools (e.g., an "alpha matting inference" brick associated with a machine learning model used to extract foreground objects, an "image compositor" brick for generating composite images based on multiple images, to name a few).

Each brick may be associated with a set of data types that can be inputted to the brick (or outputted by output ports connected to the input port of the brick), and a set of data types that can be outputted by the brick (or accepted by input ports connected to the output port of the brick). Such information can be stored in the data repository 140 (e.g., for each brick or for each brick type). In some embodiments, the data types can be one or more of (i) an image or a set of images, (ii) a 2-dimensional data structure such as a dataframe or a matrix, or a set of such 2-dimensional data structures, or (iii) a string or a set of strings. In other embodiments, other data types can be used.

Another example use case is a background removal workflow. For example, the user may load a pre-generated background removal workflow, which may include an image input I/O brick (usable to specify an input image from which the background is to be removed and a coarse background image highlighting the background region), an alpha matting inference brick (usable to determine the regions of the input image that correspond to the foreground and the background, respectively), an image compositor brick (usable to generate a composite image by taking the input image and replacing the background region of the input image with a second image), and an image writer brick (usable to store the composite image to a specific location such as a storage disk). The user can configure these bricks as desired, and test/execute the workflow, or deploy the workflow to a target destination. The user may configure the workflow to generate another artwork by adding a second I/O brick for reading a second replacement background image, a second image compositor for generating a second composite image, and a second image writer for writing the second composite image to a destination location.

Although the above example relies on a pre-trained machine learning model that performs background extraction, in some embodiments, the user may choose to further augment the pre-trained model before using the model, or train another model from scratch (e.g., to improve the accuracy and/or performance of the model) by building and executing a training workflow that includes the model prior to using that model in the background removal workflow described above.

Although not illustrated in FIGS. 2-4, in some embodiments, the code generation system 106 may allow the user to create a composite workflow of workflows, where each workflow in the composite workflow may include one or more bricks. In some of such embodiments, the composite workflow may include only workflows, and not bricks. In such a composite workflow, a graphical icon (or the input or output port thereof) representing a workflow (e.g., a specific arrangement of bricks and brick connections) may be connected to another graphical icon (or the input or output port thereof) representing another workflow. In other embodiments, a composite workflow may include both workflows and bricks, where one or more bricks are arranged alongside one or more workflows (e.g., each represented by a visual element or icon) and connected to each other to define the composite workflow. In such a composite workflow, the output port of at least one brick may be connected to the input port of at least one workflow. Additionally or alternatively, the output port of at least one workflow may be connected to the input port of at least one brick.

Example Routine for Generating, Testing, and Deploying a Customized Application

Figure 5:
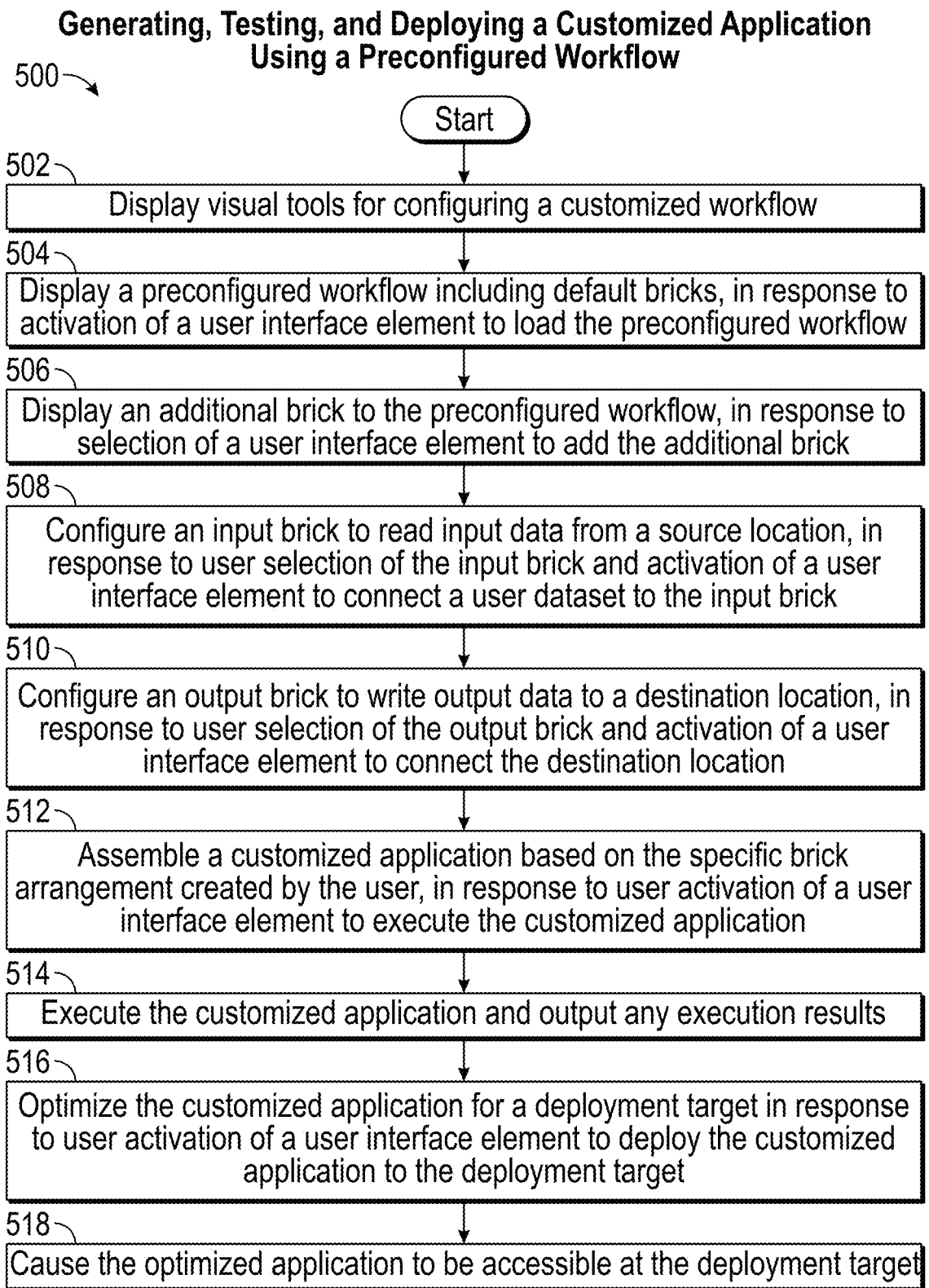
FIG. 5 is a flowchart of an example process for generating, testing, and deploying a customized application using a preconfigured workflow, in accordance with aspects of the present disclosure.

FIG. 5 depicts an illustrative routine 500 for generating, testing, and deploying a customized application using a preconfigured workflow, in accordance with aspects of the present disclosure. The routine 500 may be carried out, for example, by the workflow creation service 130, the optimization and deployment service 150, or one or more other components of the code generation system 106 described herein. For convenience, some or all of the steps of the routine 500 are described as being performed by the code generation system 106. For example, the code generation system 106 (or its components) may include one or more hardware computing devices and non-transitory physical computer storage storing instructions that, when executed by the one or more hardware computing devices, cause the one or more hardware computing devices to perform the steps of the routine 500.

The routine 500 begins at block 502, at which the code generation system 106 displays visual tools for configuring a customized workflow. As shown in FIGS. 2-4, the visual tools may include user interface elements (e.g., bricks) that can be dragged onto a working area of the workflow modification user interface and configured in the customized workflow to define which tasks are to be performed as part of the customized workflow and how such tasks are to be performed.

At block 504, the code generation system 106 displays a preconfigured workflow including default bricks, in response to activation of a user interface element to load the preconfigured workflow. For example, as shown in FIGS. 2A and 2B and FIGS. 3A and 3B, when the user loads a preconfigured workflow, one or more user-manipulatable bricks that are part of the preconfigured workflow may be displayed in the working area for further modification and configuration by the user.

At block 506, the code generation system 106 displays an additional brick to the preconfigured workflow, in response to selection of a user interface element to add the additional brick. In the example of FIG. 2B, the user is dragging the "resize image" brick onto the working area of the workflow modification user interface, which already includes two bricks that are part of the preconfigured workflow previously loaded onto the working area of the workflow modification user interface.

At block 508, the code generation system 106 configures an input brick to read input data from a source location, in response to user selection of the input brick and activation of a user interface element to connect a user dataset to the input brick. As shown in FIG. 2C, the user can click on the input brick (e.g., I/O brick, shown with a highlighted/bolded outline/border) called "unlabeled image source" and specify the folder in which the input images are stored and/or will be accessed from when the workflow is executed.

At block 510, the code generation system 106 configures an output brick to write output data to a destination location, in response to user selection of the output brick and activation of a user interface element to connect the output brick to the destination location.

At block 512, the code generation system 106 assembles a customized application based on the specific brick arrangement created by the user, in response to user activation of a user interface element to execute the customized application. For example, the code generation system 106 may, in response to a request from the user to execute or deploy the workflow, identify a set of code modules corresponding to the set of user-manipulatable bricks in the customized workflow. Each of such code modules may be designated in the data repository as being associated with a different user-manipulatable brick of the user-manipulatable bricks. The code generation system 106 may then assemble the identified code modules to generate an executable software application. In some embodiments, the code generation system 106 may compile the assembled set of code modules into object code (or an executable file) that can be executed by the processor(s) in the computing environment in which the customized workflow is created/modified (e.g., for testing, visualizing, optimizing, etc.) and/or by the processor(s) in the computing environment in which the customized workflow is accessed/run (e.g., to perform the tasks intended to be performed by the workflow on behalf of other users).

In some embodiments, the code generation system 106 may generate the software application at least by stringing two or more function calls together. For example, the code generation system 106 may take the input data (e.g., indicated by the user using an input I/O brick shown in the workflow modification user interface as being fed to the customized workflow) and feed it to one or more functions or code modules corresponding to a first set of bricks (e.g., to which the output port of the input I/O brick is connected by the user in the workflow modification user interface), and take the output data generated by a second set of bricks (e.g., to which the output ports of the first set of bricks are connected by the user in the workflow modification user interface, where the first set of bricks and the second set of bricks may or may not have one or more overlapping bricks) and feed it to one or more functions or code modules corresponding to the second set of bricks, and so on, until the code generation system 106 reaches an output I/O brick, at which point the code generation system 106 outputs the data indicated in the workflow modification user interface as being received by the output I/O brick to a destination location, as configured by the user via the workflow modification user interface.

In some embodiments, the code generation system 106 may use one or more linking code modules that link the one or more functions or code modules corresponding to the individual bricks shown in the customized workflow. For example, to generate the executable software application for a customized workflow that includes 4 bricks (e.g., Brick A→Brick B→Brick C→Brick D), the code generation system 106 may use a code module X to link a code module A' corresponding to Brick A and a code module B' corresponding to Brick B, use a code module Y to link the code module B' corresponding to Brick B and a code module C' corresponding to Brick C, and use a code module Z to link the code module C' corresponding to Brick C and a code module D' corresponding to Brick D.

In some embodiments, a given brick may correspond to multiple code modules or multiple sets of code modules, where the code generation system 106 can pick (e.g., either during assembly at block 512 or during optimization at block 516) the code module or set of code modules that would be the best fit in view of the manner in which the workflow has been customized. For example, if the user has configured an I/O brick to provide image data to the workflow, the code generation system 106 may select, from the multiple code modules that correspond to the I/O brick, a code module that is best suited for fetching or receiving image data. On the other hand, if the user has configured the I/O brick to provide text data to the workflow, the code generation system 106 may select, from the multiple code modules that correspond to the I/O brick, a code module that is best suited for fetching or receiving text data.

As another example, if the user has configured a transform brick to receive and process/transform image data, the code generation system 106 may select, from the multiple code modules that correspond to the transform brick, a code module that is best suited for processing/transforming image data. On the other hand, if the user has configured the transform brick to receive and process/transform text data, the code generation system 106 may select, from the multiple code modules that correspond to the transform brick, a code module that is best suited for processing/transforming text data.

As yet another example, if the user has included a learnable brick in a workflow to be tested and/or trained in a computing environment with large amounts of available computing resources (e.g., based on the user's indication that the workflow is to be tested and/or trained in the cloud, or based on the user's specification that a relatively large amounts of computing resources are available for testing and/or training the workflow/model), the code generation system 106 may select, from the multiple code modules that correspond to the learnable brick, a code module that is associated with a machine learning model that has the best performance (or can be trained to be the most accurate) regardless of whether training the model consumes large amounts of computing resources. For example, the code generation system 106 may, based on the information about the training environment or training resources, select a set of code modules associated with a machine learning classifier that is suited for being trained and/or tested a high-power training environment. On the other hand, if the user has included a learnable brick in a workflow to be trained and/or tested in a computing environment with limited amounts of available computing resources (e.g., based on the user's indication that the workflow is to be trained and/or tested on an edge device with limited computing resources, or based on the user's specification that a relatively small amounts of computing resources are available for testing and/or training the workflow/model), the code generation system 106 may select, from the multiple code modules that correspond to the learnable brick, a code module that is associated with a machine learning model that has the best performance (or can be trained to be the most accurate) under limited computing resource availability conditions. For example, the code generation system 106 may, based on the information about the training environment or training resources, select a set of code modules associated with a machine learning classifier that is suited for being trained and/or tested in a low-power environment.

At block 514, the code generation system 106 executes the customized application and output any execution results. For example, the outputted execution results (or visualizations thereof as a graph, a chart, or other forms of visual representation) may allow the user to further tweak the workflow by modifying the configurations for (or replacing) one or more of the bricks that are part of the workflow.

At block 516, the code generation system 106 optimizes the customized application for a deployment target in response to user activation of a user interface element to deploy the customized application to the deployment target. For example, during optimization, one or more techniques described above with reference to block 512 (code assembly) may be performed based on the characteristics of the deployment target environment. For example, if the user has included a learnable brick in a workflow to be deployed in a computing environment with large amounts of available computing resources (e.g., based on the user's indication that the workflow is to be deployed in the cloud, or based on the user's specification of a relatively large amounts of available computing resources), the code generation system 106 may select, from the multiple code modules that correspond to the learnable brick, a code module that is associated with a machine learning model that has the best performance regardless of whether the model consumes large amounts of computing resources. For example, the code generation system 106 may, based on the information about the deployment target, select a set of code modules associated with a machine learning classifier that is suited for a high-power environment. On the other hand, if the user has included a learnable brick in a workflow to be deployed in a computing environment with limited amounts of available computing resources (e.g., based on the user's indication that the workflow is to be deployed on a small drone, or based on the user's specification of a relatively small amounts of available computing resources), the code generation system 106 may select, from the multiple code modules that correspond to the learnable brick, a code module that is associated with a machine learning model that has the best performance under limited computing resource availability conditions. For example, the code generation system 106 may, based on the information about the deployment target, select a set of code modules associated with a machine learning classifier that is suited for a low-power environment.

Once the machine learning solution has been built (e.g., via blocks 502-510), the code generation system 106 compiles and distributes the workflow to user-defined deployment targets. The code generation system 106 may automatically measure execution performance and generate an execution plan by performing model-agnostic optimizations (e.g., improving/optimizing memory allocations, parallelism, and distribution) and model-specific optimizations (e.g., quantization, pruning, and distillation to improve/optimize the performance of the model). The optimization process may be performed based on the amount of computing resources available at the target destination as well as any other characteristics of the target environment such as, for example, the operating system, language runtime, CPU architecture, etc. The final optimized graph (workflow) can be exported as a library, a web service, or an executable for easy integration with third-party systems.

The code generation system 106 may perform the optimization based on the amount of available processing power (e.g., GPU/CPU/DSP/etc.), type of architecture, the amount of available memory (e.g., high, medium, low, or a specific amount), and any other resources such as disk space and network bandwidth available at the deployment target. The code generation system 106 may utilize and optimize for a combination of metrics including, but not limited to, accuracy, F1-score, precision, recall, speed, training time, training resource cost, execution time, execution resource cost, and the like. Some example deployment targets include containerization platforms such as Docker, serverless code execution platforms such as AWS Lambda, command line applications that can be interacted with through command line interfaces (CLIs), libraries (a collection of computer programs for use in software development), among others. Some example architecture implemented at the deployment targets include Arm, Intel, Nvidia, Qualcomm, Ambarella, among others.

In some embodiments, the code generation system 106 may perform one or more optimizations described herein based on measurements. For example, the code generation system 106 may perform a coarse-to-fine grid search over the tunable settings and fine tune the parameters for each deployment type. Some examples of tunable settings are numeric precision, number of threads, thread grid and block size for GPUs, choice of convolution and other algorithms based on the balance of memory bandwidth and compute, operation serialization and results caching for fitting big models into small memory. In some embodiments, the code generation system 106 may deploy a workflow with one combination of tunable settings, take one set of measurements, deploy the workflow with another combination of tunable settings, take another set of measurements, and compare the measurements to see which performs better. During testing and/or optimization, certain operations/primitives, once optimized, can be cached and reused when used in another workflow. For example, such operations/primitives can be cached in the testing/optimization environment (e.g., stored in a table for each combination of parameters and for the same chip and memory configuration). This cache can be shared globally to train machine learning models to predict the runtime for a given set of configurations on a chip over time to reduce number of actual measurements needed. For example, using the techniques described herein, the code generation system 106 may optimize a workflow that is to be deployed on AWS Lambda differently from the way another workflow to be deployed as a library might be optimized. Similarly, the code generation system 106 may optimize a workflow that is to be deployed on a target that uses Intel processors differently from the way it would optimize another workflow to be deployed on a target that uses Qualcomm processors.

At block 518, the code generation system 106 causes the optimized application to be accessible at the deployment target. For example, based on the information provided by the user about the deployment target, the code generation system 106 may deploy the optimized application at the click of a single button (e.g., a deployment button presented alongside the toolbox in the workflow modification user interface).

The routine 500 can include fewer, more, or different blocks than those illustrated in FIG. 5 and/or one or more blocks illustrated in FIG. 5 may be modified, omitted, or switched without departing from the spirit and scope of the description. Moreover, it will be appreciated by those skilled in the art and others that some or all of the functions described in this disclosure may be embodied in software executed by one or more processors of the code generation system 106 and/or the user computing device 102 disclosed herein.

Figure 6:
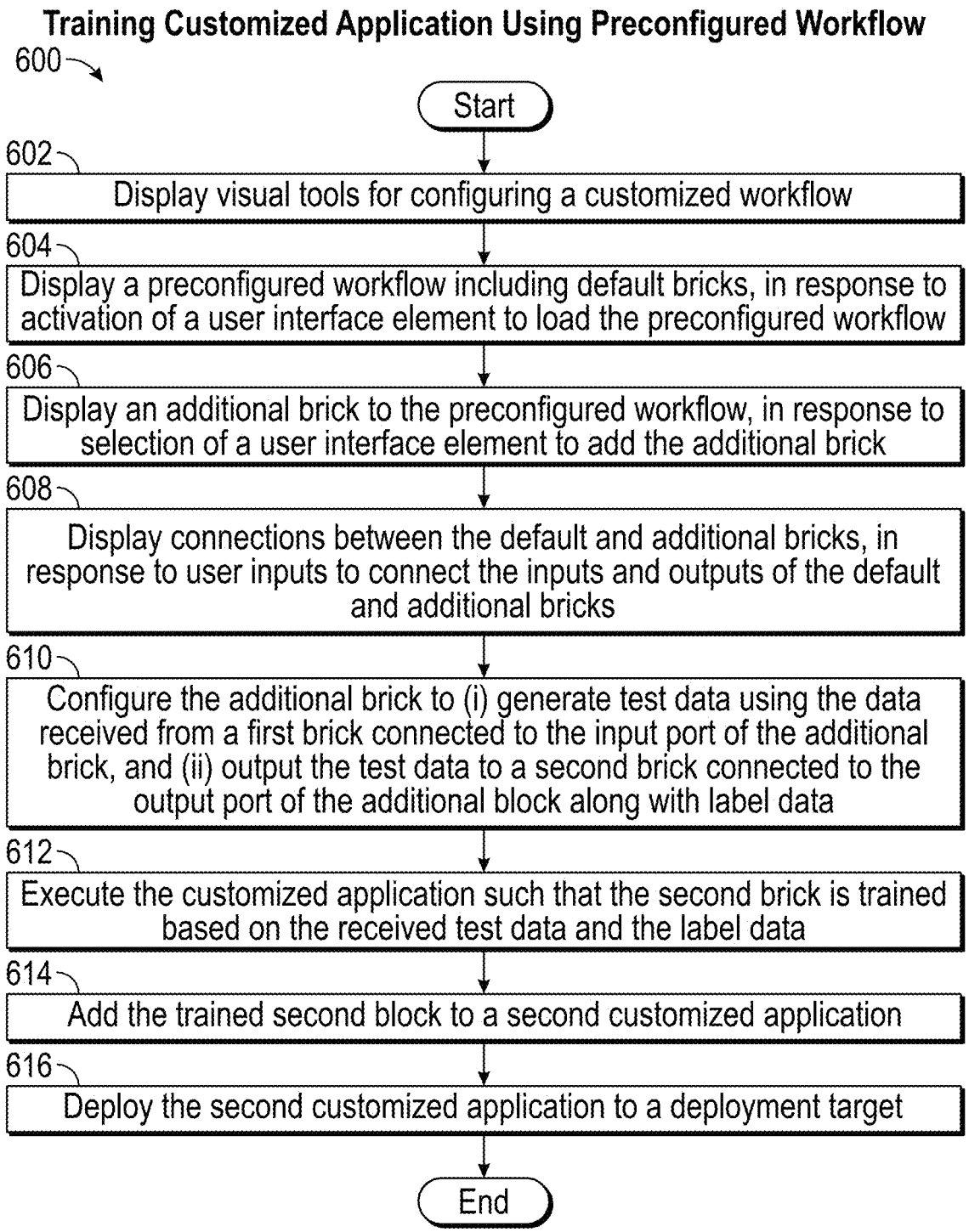
FIG. 6 is a flowchart of an example process for training a customized application using a preconfigured workflow, in accordance with aspects of the present disclosure.

Example Routine for Training a Customized Application Using a Preconfigured Workflow FIG. 6 depicts an illustrative routine 600 for training a customized application using a preconfigured workflow, in accordance with aspects of the present disclosure. The routine 600 may be carried out, for example, by the workflow creation service 130, the optimization and deployment service 150, or one or more other components of the code generation system 106 described herein. For convenience, some or all of the steps of the routine 600 are described as being performed by the code generation system 106. For example, the code generation system 106 (or its components) may include one or more hardware computing devices and non-transitory physical computer storage storing instructions that, when executed by the one or more hardware computing devices, cause the one or more hardware computing devices to perform the steps of the routine 600.

The routine 600 begins at block 602, at which the code generation system 106 displays visual tools for configuring a customized workflow. As shown in FIGS. 2-4, the visual tools may include user interface elements (e.g., bricks) that can be dragged onto a working area of the workflow modification user interface and configured in the customized workflow to define which tasks are to be performed as part of the customized workflow and how such tasks are to be performed.

At block 604, the code generation system 106 displays a preconfigured workflow including default bricks, in response to activation of a user interface element to load the preconfigured workflow. For example, as shown in FIGS. 2A and 2B and FIGS. 3A and 3B, when the user loads a preconfigured workflow, one or more user-manipulatable bricks that are part of the preconfigured workflow may be displayed in the working area for further modification and configuration by the user.

At block 606, the code generation system 106 displays an additional brick to the preconfigured workflow, in response to selection of a user interface element to add the additional brick. In the example of FIG. 2B, the user is dragging the "resize image" brick onto the working area of the workflow modification user interface, which already includes two bricks that are part of the preconfigured workflow previously loaded onto the working area of the workflow modification user interface.

At block 608, the code generation system 106 displays connections between the default and additional bricks, in response to user inputs to connect the inputs and outputs of the default and additional bricks. For example, as shown in FIG. 2C, the user may click on the output port (indicated by the circle on the right side of the I/O brick) of the I/O brick, drag the cursor to the input port (indicated by the circle on the left side of the resize brick) of the resize brick, and let go of the cursor. In response, the code generation system 106 may display the connection between the I/O brick and the resize brick, as shown in FIG. 2D. Further, the user may add another brick ("blur augmentation" brick) and connect the brick to the "network training" brick that was part of the preconfigured workflow. The "blur augmentation" brick may be referred to as the additional brick in this example.

At block 610, the code generation system 106 configures the additional brick to (i) generate test data using the data received from a first brick connected to the input port of the additional brick, and (ii) output the test data to a second brick connected to the output port of the additional brick along with label data. As shown in FIG. 2G, the "blur augmentation" brick has been configured by the user to generate test data to be used to train the machine learning model associated with the "network training" brick and output the generated test data (e.g., a set of images with varying degrees of blur applied thereto) along with label data indicating whether a given image in the set of images should be determined as being blurred or not being blurred.

At block 612, the code generation system 106 execute the customized application such that the second brick is trained based on the received test data and the label data. For example, although not shown in FIG. 6, the process 600 may include the code assembly and/or optimization steps of FIG. 5.

At block 614, the code generation system 106 adds the trained second brick to a second customized application. For example, the user may save the trained learnable brick ("network training" brick in FIG. 2G) and use the trained learnable brick to build another workflow that utilizes the machine learning model associated with the learnable brick (e.g., to perform blur detection).

At block 616, the code generation system 106 deploys the second customized application to a deployment target. For example, based on the information provided by the user about the deployment target, the code generation system 106 may deploy the optimized application at the click of a single button (e.g., a deployment button presented alongside the toolbox in the workflow modification user interface)

The routine 600 can include fewer, more, or different blocks than those illustrated in FIG. 6 and/or one or more blocks illustrated in FIG. 6 may be modified, omitted, or switched without departing from the spirit and scope of the description. Moreover, it will be appreciated by those skilled in the art and others that some or all of the functions described in this disclosure may be embodied in software executed by one or more processors of the code generation system 106 and/or the user computing device 102 disclosed herein.

Example Routine for Visualizing the Result of an Image Analyzer Workflow

Figure 7:
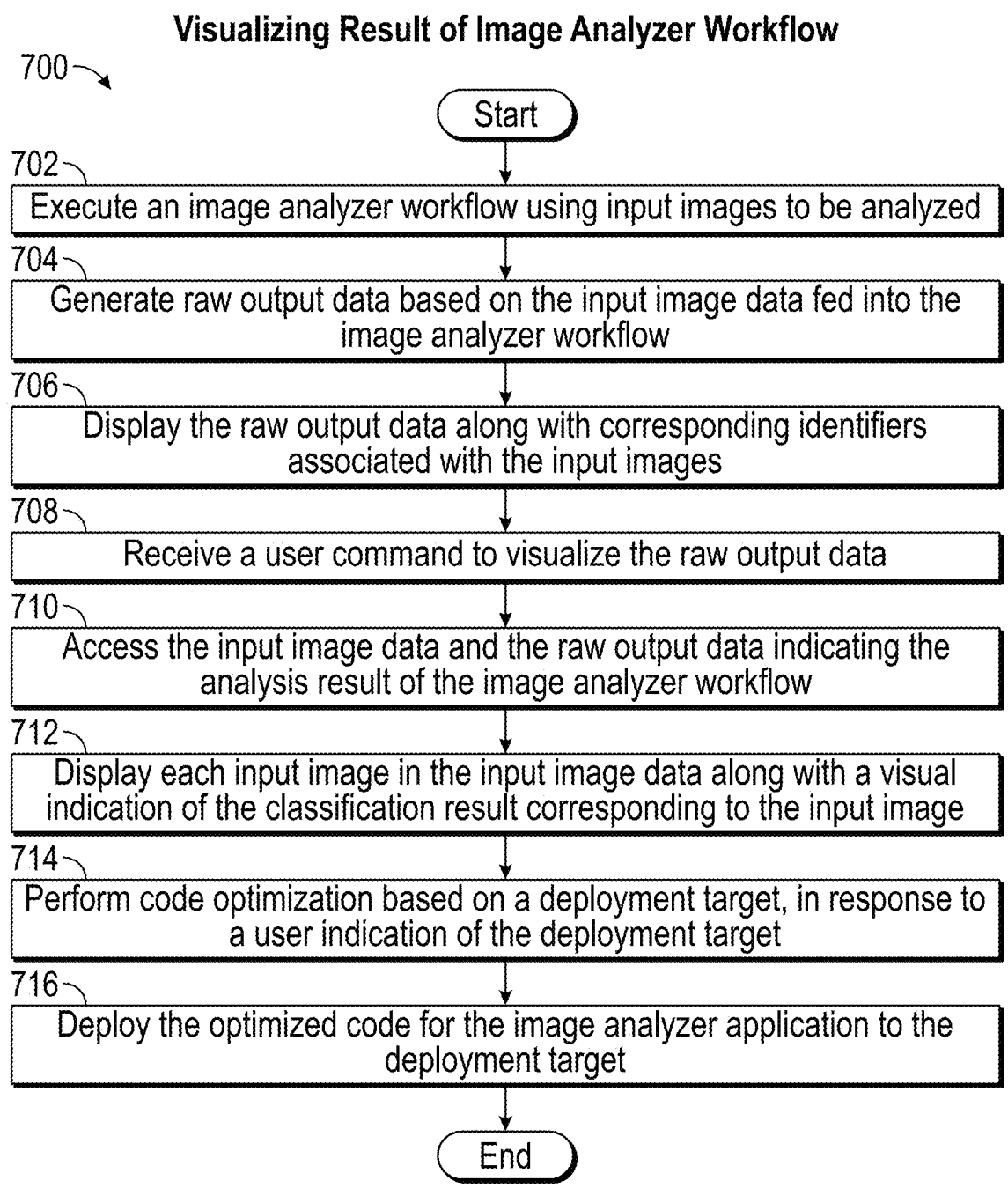
FIG. 7 is a flowchart of an example process for visualizing the result of an image analyzer workflow, in accordance with aspects of the present disclosure.

FIG. 7 depicts an illustrative routine 700 for visualizing the result of an image analyzer workflow, in accordance with aspects of the present disclosure. The routine 700 may be carried out, for example, by the workflow creation service 130, the optimization and deployment service 150, or one or more other components of the code generation system 106 described herein. For convenience, some or all of the steps of the routine 700 are described as being performed by the code generation system 106. For example, the code generation system 106 (or its components) may include one or more hardware computing devices and non-transitory physical computer storage storing instructions that, when executed by the one or more hardware computing devices, cause the one or more hardware computing devices to perform the steps of the routine 700.

The routine 700 begins at block 702, at which the code generation system 106 executes an image analyzer workflow using input images to be analyzed. For example, the user may have previously configured the image analyzer workflow using the tools provided by the code generation system 106 (e.g., as shown in FIGS. 2A-2G).

At block 704, the code generation system 106 generates raw output data based on the input image data fed into the image analyzer workflow. For example, in response to the user activation of an "execute" user interface button shown in FIG. 3D (first icon in the top menu bar), the code generation system 106 may assemble the relevant code modules (e.g., as described above with reference to block 512) into a software application and executes the software application.

At block 706, the code generation system 106 displays the raw output data along with corresponding identifiers associated with the input images. For example, as shown in FIG. 3E, the raw output data (probability values in columns B and C, indicating whether a given input image is blurred or not blurred) may be displayed along with the image file names (column A).

At block 708, the code generation system 106 receives a user command to visualize the raw output data. For example, the user may activate a "visualize" user interface button provided in the workflow modification user interface to provide such a command to the code generation system 106.

At block 710, the code generation system 106 accesses the input image data and the raw output data indicating the analysis result of the image analyzer workflow. For example, for each file name shown in FIG. 3E, the code generation system 106 may access the corresponding image, and the code generation system 106 may also access the raw probability data shown in FIG. 3E, and convert the probability data to user-recognizable visual indications such as "blurred" (e.g., if the probability value in column B is lower than 0.5) or "not blurred" (e.g., if the probability value in column B is greater than or equal to 0.5).

At block 712, the code generation system 106 displays each input image in the input image data along with a visual indication of the classification result corresponding to the input image. In this example, the code generation system 106 can display the series of images (e.g., as a continuous video or as a discrete set of slides) with the visual indications superimposed thereon, as shown in FIGS. 3F and 3G.

At block 714, the code generation system 106 performs code optimization based on a deployment target, in response to a user indication of the deployment target. For example, the code generation system 106 may perform the optimization as described with reference to block 516.

At block 716, the code generation system 106 deploy the optimized code for the image analyzer application to the deployment target. For example, based on the information provided by the user about the deployment target, the code generation system 106 may deploy the image analyzer application at the click of a single button (e.g., a deployment button presented alongside the toolbox in the workflow modification user interface) at a deployment target such as (i) a drone device that may use the image analyzer application to analyze the images captured by a camera on the drone device, or (ii) a remote cloud server that may host the image analyzer application so that users of the remote cloud server can use the image analyzer application to analyze their own images.

The routine 700 can include fewer, more, or different blocks than those illustrated in FIG. 7 and/or one or more blocks illustrated in FIG. 7 may be modified, omitted, or switched without departing from the spirit and scope of the description. Moreover, it will be appreciated by those skilled in the art and others that some or all of the functions described in this disclosure may be embodied in software executed by one or more processors of the code generation system 106 and/or the user computing device 102 disclosed herein.

Example Routine for Training a New Prediction Model

Figure 8:
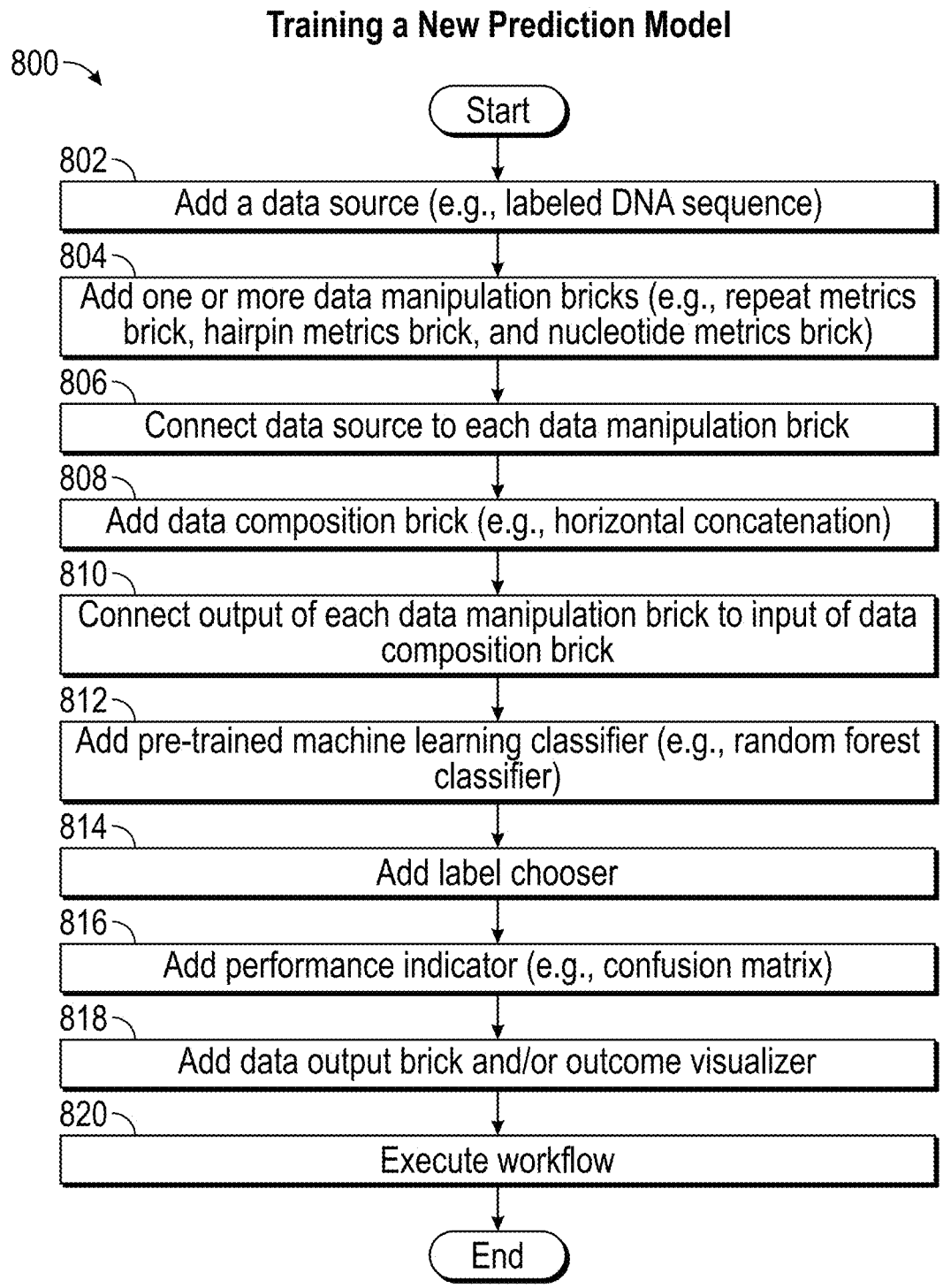
FIG. 8 is a flowchart of an example process for training a new prediction model, in accordance with aspects of the present disclosure.

FIG. 8 depicts an illustrative routine 800 for training a new prediction model, in accordance with aspects of the present disclosure. The routine 800 may be carried out, for example, by the workflow creation service 130, the optimization and deployment service 150, or one or more other components of the code generation system 106 described herein. For convenience, some or all of the steps of the routine 800 are described as being performed by the code generation system 106. For example, the code generation system 106 (or its components) may include one or more hardware computing devices and non-transitory physical computer storage storing instructions that, when executed by the one or more hardware computing devices, cause the one or more hardware computing devices to perform the steps of the routine 800.

The routine 800 begins at block 802, at which the code generation system 106 adds a data source (e.g., labeled DNA sequence brick shown in FIG. 4). For example, a user may drag a "labeled DNA sequence" brick from the toolbox in FIG. 4 onto the working area of the workflow modification user interface, and specify a path to the DNA sequence file stored on the user computing device 102.

At block 804, the code generation system 106 adds one or more data manipulation bricks (e.g., repeat metrics brick, hairpin metrics brick, and nucleotide metrics brick as shown in FIG. 4). For example, the user may drag any number of data manipulations bricks (also referred to herein as transform bricks) from the toolbox onto the working area of the workflow modification user interface.

At block 806, the code generation system 106 connects data source to each data manipulation brick. For example, as shown in FIG. 4, the user may connect the output port of the labeled DNA sequence brick to the input port of each of those data manipulations bricks to perform parallel data manipulations. In other embodiments, the user may connect one or more of the transform bricks serially to perform serial data manipulations.

At block 808, the code generation system 106 adds a data composition brick (e.g., horizontal concatenation as shown in FIG. 4). For example, the user may drag a data composition brick from the toolbox onto the working area of the workflow modification user interface.

At block 810, the code generation system 106 connects output of each data manipulation brick to input of data composition brick. For example, as shown in FIG. 4, the user may connect the output ports of the repeat metrics brick, hairpin metrics brick, and nucleotide metrics brick to the input port of the horizontal concatenation brick to generate a composite dataframe based on the dataframes received from the repeat metrics brick, hairpin metrics brick, and nucleotide metrics brick.

At block 812, the code generation system 106 adds pre-trained machine learning classifier (e.g., random forest classifier as shown in FIG. 4). For example, the user may drag a pre-trained machine learning classifier from the toolbox onto the working area of the workflow modification user interface.

At block 814, the code generation system 106 adds label chooser. For example, the user may drag a label chooser brick from the toolbox onto the working area of the workflow modification user interface. The label chooser brick may be configured to receive a composite dataframe as input and output predicted label data.

At block 816, the code generation system 106 adds a performance indicator (e.g., confusion matrix as shown in FIG. 4). For example, the user may drag a performance indicator brick from the toolbox onto the working area of the workflow modification user interface. The performance indicator brick may be configured to receive the predicted label data from the label chooser brick as well as the original label data from the labeled DNA sequence brick and output comparison data that indicates how the predicted label data compares to the original label data. In some embodiments, one or more bricks used in the workflow may not have an input port (e.g., input data is pre-configured into the brick) or an output port (e.g., output data is not generated or generated but need not be fed into another brick, as shown in FIG. 4 for the CSV sink brick, the confusion matrix brick, and the ROC curve visualizer brick). In some embodiments, the user may add and/or remove an input port and/or an output port.

At block 818, the code generation system 106 adds a data output brick and/or an outcome visualizer. For example, the user may drag a CSV sink brick and an ROC curve visualizer brick from the toolbox onto the working area of the workflow modification user interface. The CSV sink brick may be of the I/O brick type and configured to store the received data to a destination location. The ROC curve visualizer brick may be of the evaluation brick type and configured to display an ROC curve allowing the user to visualize the true positive rate vs. the false positive rate.

At block 820, the code generation system 106 executes the workflow. For example, after the workflow has been fully customized by the user as desired, the user may activate the execute button to cause the software application to be generated based on the customized workflow and any testing/evaluation data to be presented to the user.

The routine 800 can include fewer, more, or different blocks than those illustrated in FIG. 8 and/or one or more blocks illustrated in FIG. 8 may be modified, omitted, or switched without departing from the spirit and scope of the description. Moreover, it will be appreciated by those skilled in the art and others that some or all of the functions described in this disclosure may be embodied in software executed by one or more processors of the code generation system 106 and/or the user computing device 102 disclosed herein.

Figure 9:
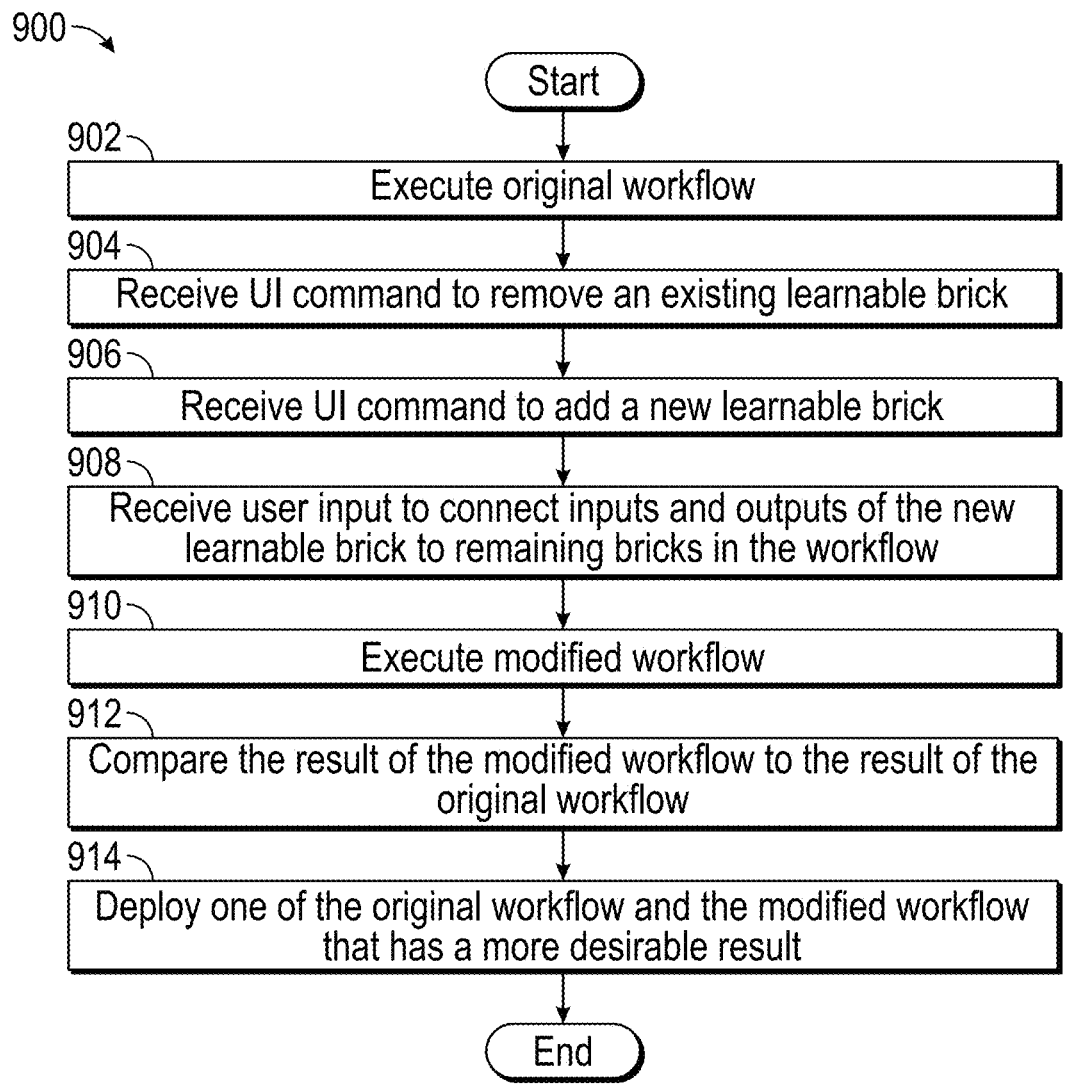
FIG. 9 is a flowchart of an example process for testing multiple workflows and deploying a selected workflow, in accordance with aspects of the present disclosure.

Example Routine for Testing Multiple Workflows and Deploying a Selected Workflow FIG. 9 depicts an illustrative routine 900 for testing multiple workflows and deploying a selected workflow, in accordance with aspects of the present disclosure. The routine 900 may be carried out, for example, by the workflow creation service 130, the optimization and deployment service 150, or one or more other components of the code generation system 106 described herein. For convenience, some or all of the steps of the routine 900 are described as being performed by the code generation system 106. For example, the code generation system 106 (or its components) may include one or more hardware computing devices and non-transitory physical computer storage storing instructions that, when executed by the one or more hardware computing devices, cause the one or more hardware computing devices to perform the steps of the routine 900.

The routine 900 begins at block 902, at which the code generation system 106 executes an original workflow. For example, the original workflow may be a pre-generated workflow or a user-customized workflow. As shown in FIG. 4, the execution of the original workflow may cause one or more visualizations to be displayed to the user, to allow the user to evaluation the performance of the original workflow.

At block 904, the code generation system 106 receives a UI command to remove an existing learnable brick. Based on the result of the execution at block 902, the user may decide to modify the workflow by replacing one or more of the existing bricks in the original workflow. For example, the removed brick may be the network inference brick in the example of FIG. 3D to be replaced with another network inference brick, or the random forest classifier brick in the example of FIG. 4 to be replaced with a logistic regression inference brick. As another example, a geneticist working with the workflow of FIG. 4 may decide to replace one or more of the repeat metrics brick, hairpin metrics brick, and nucleotide metrics brick to re-train the machine learning model(s) based on other types of data manipulations.

At block 906, the code generation system 106 receives a UI command to add a new learnable brick. For example, the bricks described in the above paragraph can be dragged from the toolbox (or loaded from a custom file location) onto the working area of the workflow modification user interface.

At block 908, the code generation system 106 receives user input to connect inputs and outputs of the new learnable brick to remaining bricks in the workflow. For example, as shown in FIGS. 2E-2G, the new brick can be connected to the existing bricks as desired by the user.

At block 910, the code generation system 106 executes the modified workflow. As shown in FIG. 4, the execution of the modified workflow may cause one or more visualizations to be displayed to the user, to allow the user to evaluation the performance of the modified workflow, and those visualizations may differ from the visualizations originally displayed at block 902 in response to executing the original workflow.

At block 912, the code generation system 106 compares the result of the modified workflow to the result of the original workflow. For example, the code generation system 106 may display the respective visualizations side by side, highlighting the difference/improvement. In other embodiments, the code generation system 106 may generate and output a comparison metric indicative of whether the modified workflow has resulted in improved or degraded performance. In some embodiments, instead of replacing the brick at blocks 904 and 906, the user may include the new brick in the workflow as a parallel data path, such that the performance of both of the original and new bricks can be visualized in response to executing the modified workflow.

At block 914, the code generation system 106 deploys one of the original workflow and the modified workflow that has a more desirable result. For example, the code generation system 106 may prompt the user to select the original workflow or the modified workflow for deployment. In some embodiments, the code generation system 106 may present an option to revert back to the original workflow (or load the original workflow).

The routine 900 can include fewer, more, or different blocks than those illustrated in FIG. 9 and/or one or more blocks illustrated in FIG. 9 may be modified, omitted, or switched without departing from the spirit and scope of the description. Moreover, it will be appreciated by those skilled in the art and others that some or all of the functions described in this disclosure may be embodied in software executed by one or more processors of the code generation system 106 and/or the user computing device 102 disclosed herein.

Example Routine for Generating, Testing, and Deploying a Customized Application

Figure 10:
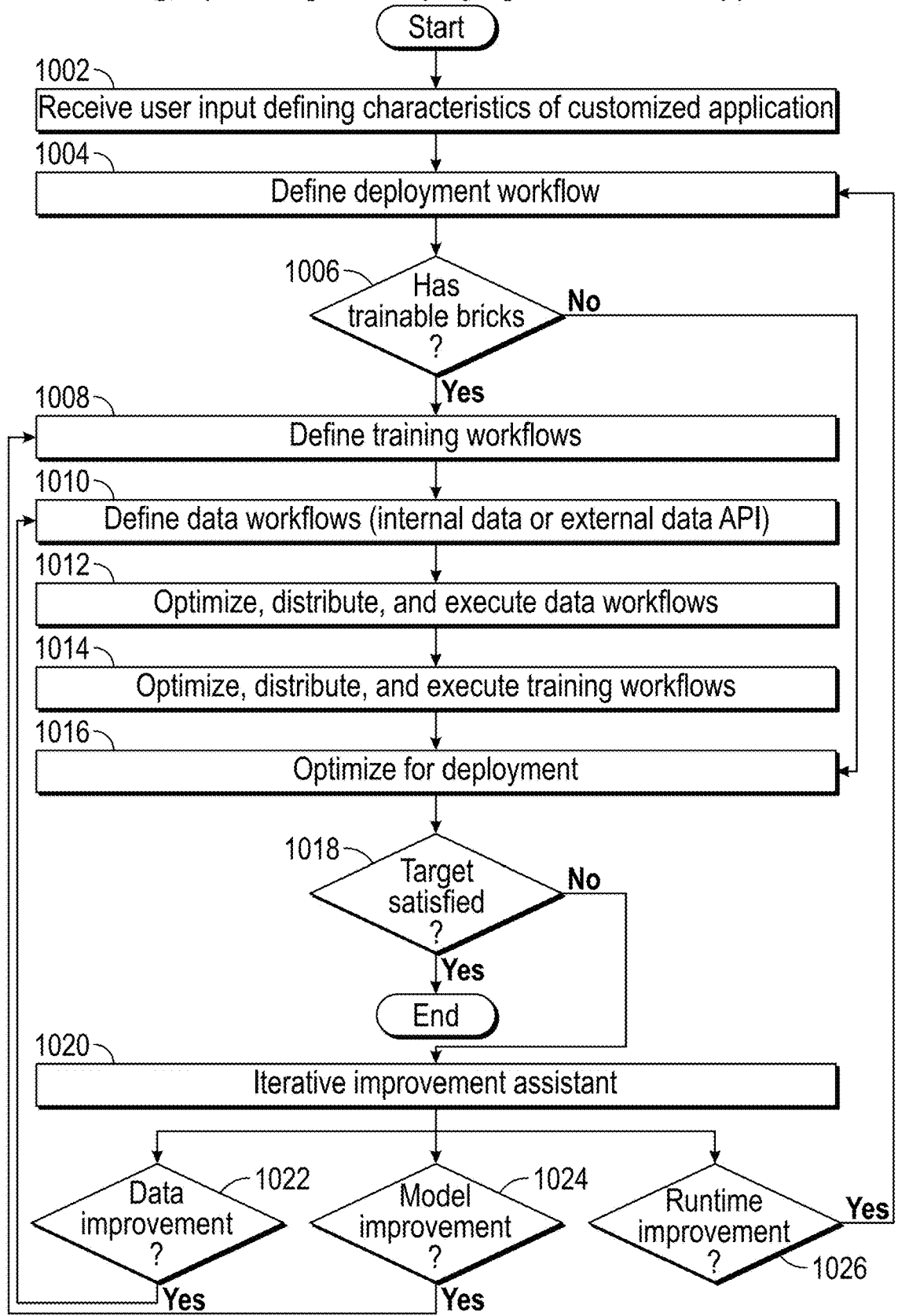
FIG. 10 is a flowchart of an example process for generating, optimizing, and deploying a customized application, in accordance with aspects of the present disclosure.

FIG. 10 depicts an illustrative routine 1000 for generating, optimizing, and deploying a customized application, in accordance with aspects of the present disclosure. The routine 1000 may be carried out, for example, by the workflow creation service 130, the optimization and deployment service 150, or one or more other components of the code generation system 106 described herein. For convenience, some or all of the steps of the routine 1000 are described as being performed by the code generation system 106. For example, the code generation system 106 (or its components) may include one or more hardware computing devices and non-transitory physical computer storage storing instructions that, when executed by the one or more hardware computing devices, cause the one or more hardware computing devices to perform the steps of the routine 1000.

The routine 1000 begins at block 1002, at which the code generation system 106 receives a user input defining the characteristics of a customized application. For example, the user may provide information relating to the problem the user is trying to solve, budget (e.g., time and/or computing resource amount), available compute resources (e.g., for training and/or for execution in the deployment environment), and/or deployment target.

At block 1004, the code generation system 106 defines a deployment workflow. For example, the deployment workflow may be any pre-generated workflow that the user wishes to deploy or user-customized workflow that the user has built using the workflow modification user interface. For example, the blur detection workflow of FIG. 3H may be used as a deployment workflow. In some embodiments, the code generation system 106 may utilize an Unsupervised Neural Architecture Search Process (UnNAS) to identify the best architecture of neural networks to be used for the software solutions.

At block 1006, the code generation system 106 determines whether the deployment workflow has one or more trainable bricks. If the code generation system 106 that the deployment workflow has one or more trainable bricks, the routine 1000 proceeds to block 1008. Otherwise, the routine 1000 proceeds to block 1016.

At block 1008, the code generation system 106 defines training workflows. For example, the blur detection training workflow of FIG. 2G may be used as a training workflow. Additionally or alternatively, the training workflows may incorporate distributed training as described herein.

At block 1010, the code generation system 106 defines data workflows (internal data or external data API). As described herein, the code generation system 106 may provide pre-generated workflows (or allow the users to create user-customized workflows) for obtaining, labeling, and otherwise modifying data that can be used to train the machine learning models (which can then be used to build deployable software applications). Such data workflows can be configured to communicate with internal data stores or external data providers using APIs to generate and/or modify datasets usable for generating machine learning solutions.

At block 1012, the code generation system 106 optimizes, distributes, and executes the data workflows.

At block 1014, the code generation system 106 optimizes, distributes, and executes the training workflows.

At block 1016, the code generation system 106 optimizes for deployment. For example, as described herein, the optimization may be specific to the target environment in which the software solution is to be deployed. In some embodiments, the code generation system 106 performs the optimization based on the user's indication of the parameters that are more important to the user. For example, if the user indicates that the user does not care about accuracy but wants a solution that is really fast, the code generation system 106 may optimize for speed over accuracy. As another example, if the user indicates (e.g., via the user interface provided by the code generation system 106) that the user cares less about speed or latency but it's incredibly important to the user that the machine learning model be really accurate, the code generation system 106 may optimize for accuracy over speed. The parameters for optimization may include others such as size of the software solution, amount of computing resources consumed, etc. In some embodiments, optimization includes running different types of configurations of bricks and/or code modules and measuring and comparing the performance of each configuration, and choosing the one that best satisfies the user's desired performance.

At block 1018, the code generation system 106 determines whether all of the target requirements have been satisfied. If the code generation system 106 determines that all of the target requirements have been satisfied, the routine 1000 ends. Otherwise, the routine 1000 proceeds to block 1020.

At block 1020, the code generation system 106 identifies one or more iterative improvement steps to be performed (e.g., data improvement, model improvement, and/or runtime improvement). In some embodiments, the code generation system 106 may run one or more alternative arrangement of bricks and/or code modules and present suggestions for improving the user-customized workflow or software solution generated based on the user-customized workflow. For example, the code generation system 106 may track the amount of data and identify any data imbalance. For example, if the code generation system 106 determines that a machine learning model is overfitted and therefore the training accuracy is much higher than the test accuracy, the code generation system 106 may determine that a data improvement is needed (e.g., the amount of data needs to be increased). To increase the amount of data, the user may provide more data. In some cases, the code generation system 106 may, if the user has unlabeled data samples, automatically recognize (e.g., using active learning algorithms) the minimal subset of the unlabeled data samples that may produce a sizable improvement and present it to the user. As another example, if the code generation system 106 determines that a machine learning model is underfitted, the code generation system 106 may determine that a model improvement is needed (e.g., model capacity needs to be increased). To increase the model capacity, a bigger model with more free parameters may be chosen or recommended to the user. If the data improvement and/or the model improvement increases the runtime requirements, the code generation system 106 may determine that a runtime improvement is needed (e.g., increasing the training cost and/or deployment/execution cost). One or more of these improvements may be presented to the user of the code execution system 106 and approved by the user.

At block 1022, the code generation system 106 determines whether a data improvement can be made, and if so, the routine 1000 proceeds to block 1010. For example, the data workflow can be re-defined, and additional changes can be made to the input datasets used to train the relevant model(s) and/or generate the deployable software application.

At block 1024, the code generation system 106 determines whether a model improvement can be made, and if so, the routine 1000 proceeds to block 1008. For example, the training workflow can be re-defined, and the relevant model(s) can be re-trained to improve the model.

At block 1026, the code generation system 106 determines whether a runtime improvement can be made, and if so, the routine 1000 proceeds to block 1004. For example, the deployment workflow can be re-defined such that the size of the machine learning model used in the deployment workflow is reduced and/or the efficiency of the machine learning used in the deployment workflow is improved. For example, the code generation system 106 may facilitate or recommend selection of another machine learning model from a collection of machine learning models (which may include one that performs better or is more efficient for CPU-intensive workflows, another that performs better or is more efficient for GPU-intensive workflows, and the like). As another example, the code generation system 106 may scale down the selected machine learning model (e.g., by reducing the number of filters in a convolutional neural network by 25% in each layer, or by choosing to use cross-attention instead of self-attention for transformers, or by approximating self-attention based on a low rank approximation of the matrices).

The routine 1000 can include fewer, more, or different blocks than those illustrated in FIG. 10 and/or one or more blocks illustrated in FIG. 10 may be modified, omitted, or switched without departing from the spirit and scope of the description. Moreover, it will be appreciated by those skilled in the art and others that some or all of the functions described in this disclosure may be embodied in software executed by one or more processors of the code generation system 106 and/or the user computing device 102 disclosed herein.

Example Architecture of Computing System

Figure 11:
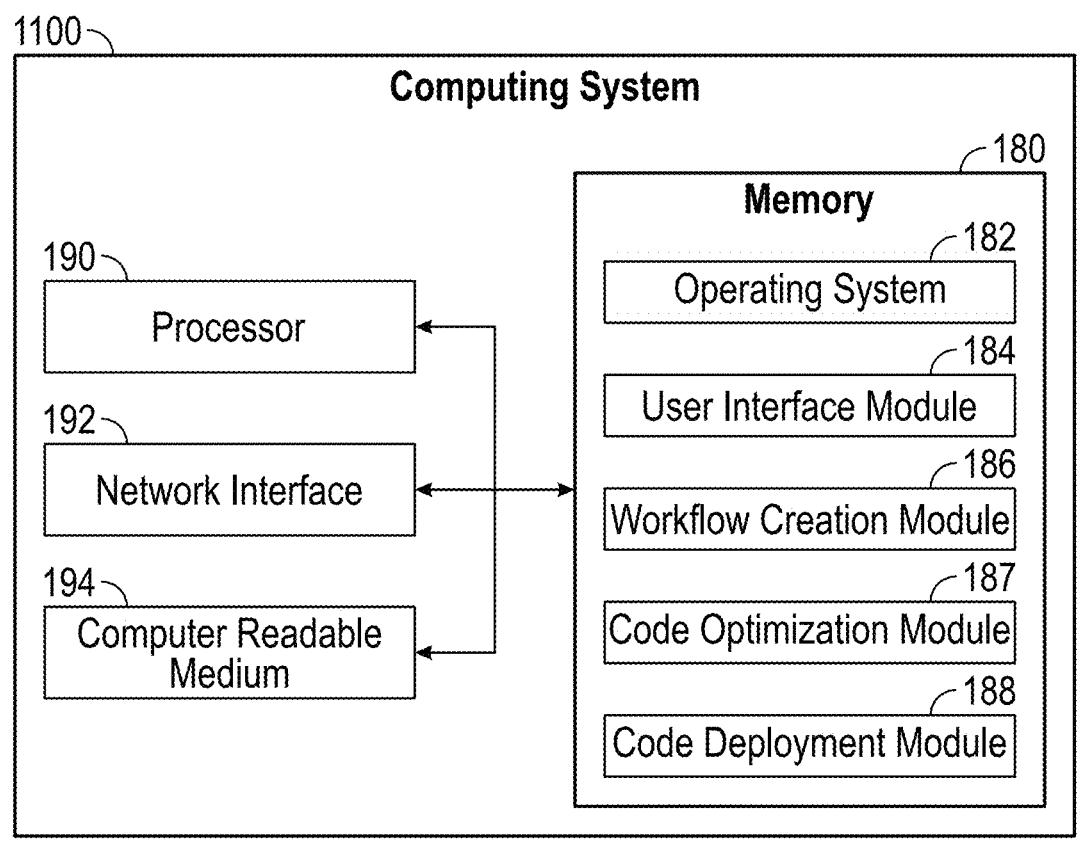
FIG. 11 depicts a general architecture of a computing system usable to implement one or more components described herein in accordance with aspects of the present disclosure.

FIG. 11 depicts an example architecture of a computing system 1100 that can be used to perform one or more of the techniques described herein or illustrated in FIGS. 1-10. The general architecture of the computing system 1100 depicted in FIG. 11 includes an arrangement of computer hardware and software modules that may be used to implement one or more aspects of the present disclosure. The computing system 1100 may include many more (or fewer) elements than those shown in FIG. 11. It is not necessary, however, that all of these elements be shown in order to provide an enabling disclosure. For example, the computing system 1100 may be used to implement one or more of the servers and/or services illustrated or described herein (e.g., the workflow creation service 130 and the code optimization and deployment service 150) and/or any of the user computing devices illustrated or described herein.

As illustrated, the computing system 1100 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 182 that provides computer program instructions for use by the processor 190 in the general administration and operation of the computing system 1100. The memory 180 may further include computer program instructions and other information for implementing one or more aspects of the present disclosure. For example, in one embodiment, the memory 180 includes a user interface module 184 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 184, the memory 180 may include various software and/or hardware modules that can be used to facilitate the operations described herein. For example, as shown in FIG. 11, the memory 180 may include a workflow creation module 186, a code optimization module 187, and a code deployment module 188, which may be executed by the processor 190. In one embodiment, the workflow creation module 186 implements aspects of the present disclosure relating to workflow creation (e.g., loading a pre-generated workflow, presenting visual tools for modifying the pre-generated workflow, facilitating configuration of bricks and connections between bricks, executing, testing, and training workflows, etc.), the code optimization module 187 implements aspects of the present disclosure relating to code optimization (e.g., modifying workflows based on user-specified parameters relating to problem, budget, available compute resources, or deployment target), and the code deployment module 188 implements aspects of the present disclosure relating to code deployment (e.g., deploying the software application generated based on the user-customized workflow to a deployment target).

Although a single processor, a single network interface, a single computer-readable medium, and a single memory are illustrated in the example of FIG. 11, in other implementations, the computing system 1100 can have a multiple of one or more of these components (e.g., two or more processors and/or two or more memories).

Enumerated Implementations (EIs)

Some examples of enumerated implementations (EIs) are provided in this section, without limitation.

EI 1: A system for facilitating generation of a software application, the system comprising: a data repository storing data defining a plurality of pre-configured workflows and a plurality of user-manipulatable bricks usable to create a new workflow or to modify an existing workflow in the plurality of pre-configured workflows; and a workflow creation service comprising computer hardware, wherein the workflow creation service is configured to at least: detect a workflow load request to load a pre-configured workflow of the plurality of pre-configured workflows, wherein the pre-configured workflow includes a set of user-manipulatable bricks of the plurality of user-manipulatable bricks, each user-manipulatable brick in the set of user-manipulatable bricks corresponds to a computer-implemented task to be performed as part of executing the pre-configured workflow, and the set of user-manipulatable bricks includes multiple brick types including at least (i) a learnable brick type representing a specific machine learning model and (ii) a transform brick type representing code configured to generate input data in a format that the specific machine learning model is configured to receive as input features; cause visual indicators representing the set of user-manipulatable bricks of the pre-configured workflow to be displayed in a workflow modification user interface along with the plurality of user-manipulatable bricks usable to modify the pre-configured workflow; detect, based on a first interaction by a user with at least one user-manipulatable brick displayed in the workflow modification user interface, a workflow modification request to perform one or both of (i) adding one or more additional user-manipulatable bricks from the plurality of user-manipulatable bricks displayed in the workflow modification user interface to the pre-configured workflow, or (ii) removing one or more existing user-manipulatable bricks of the set of user-manipulatable bricks in the pre-configured workflow; in response to the workflow modification request, cause the pre-configured workflow displayed in the workflow modification user interface to be modified according to the workflow modification request into a customized workflow that includes a modified set of user-manipulatable bricks; detect, based on a second interaction by the user in the workflow modification user interface, a brick connection request to connect two or more of the user-manipulatable bricks in the modified set of user-manipulatable bricks; in response to the brick connection request, update the workflow modification user interface to visually indicate the connection between the two or more of the user-manipulatable bricks in the modified set of user-manipulatable bricks; detect an execution request to cause execution of the customized workflow as modified by the workflow modification request and the brick connection request; identify a set of code modules corresponding to the modified set of user-manipulatable bricks of the customized workflow, wherein each code module in the set of code modules is designated in the data repository as associated with a different user-manipulatable brick of the user-manipulatable bricks; generate an executable software application at least in part by assembling the set of code modules; and cause the executable software application to be executed according to the execution request.

EI 2: The system of claim 1, wherein the workflow creation service is further configured to generate a visual feedback based at least in part on the execution of the executable software application and cause the visual feedback to be displayed in the workflow modification user interface.

EI 3: The system of claim 1, wherein the workflow creation service is further configured to: determine that an output port of a first brick of the two or more bricks associated with the brick connection request is associated output data having a first data format; determine that an input port of a second brick of the two or more bricks associated with the brick connection request is associated with input data having a second data format; and based at least in part on the first data format matching the second data format, update the workflow modification user interface to visually indicate the connection from the output port of the first brick to the input port of the second brick.

EI 4: The system of claim 1, wherein the system further comprises a code optimization and deployment service comprising computer hardware, wherein the code optimization and deployment service is configured to: receive a code deployment request to deploy the executable software application onto a target destination; modify, based at least in part on the target destination, the specific machine learning model associated with a user-manipulatable brick of the learnable brick type included in the modified set of user-manipulatable bricks; and cause a modified executable software application based at least in part on the modified specific machine learning model to be deployed onto the target destination.

EI 5: The system of claim 4, wherein modifying the specific machine learning model comprises pruning the specific machine learning model such that executing the modified executable software application consumes a fewer amount of computing resources as a result of the modification.

EI 6: The system of claim 4, wherein modifying the specific machine learning model comprises replacing the specific machine learning model with another machine learning model such that executing the modified executable software application consumes a fewer amount of computing resources as a result of the modification.

EI 7: The system of claim 1, wherein the set of user-manipulatable bricks further includes (i) an input/output brick type defining a data source storing input data to the executable software application, and (ii) an evaluation brick type configured to generate a visual feedback based on a result of executing the executable software application.

EI 8: A computer-implemented method for facilitating generation of a software application, the method comprising: detecting a request to load a workflow that includes a set of user-manipulatable bricks, wherein each user-manipulatable brick in the set of user-manipulatable bricks corresponds to a computer-implemented task to be performed as part of executing the workflow, and the set of user-manipulatable bricks includes multiple brick types including at least a first brick type representing a specific machine learning model; displaying visual indicators representing the set of user-manipulatable bricks of the workflow in a user interface along with a plurality of user-manipulatable bricks usable to modify the workflow; detecting, based on a first interaction by a user with at least one user-manipulatable brick displayed in the user interface, a workflow modification request to perform one or both of (i) adding one or more additional user-manipulatable bricks from the plurality of user-manipulatable bricks to the workflow, or (ii) removing one or more existing user-manipulatable bricks of the set of user-manipulatable bricks in the workflow; in response to the workflow modification request, causing the workflow displayed in the user interface to be modified according to the workflow modification request into a customized workflow that includes a modified set of user-manipulatable bricks; detecting, based on a second interaction by the user in the user interface, a brick connection request to connect two or more of the user-manipulatable bricks in the modified set of user-manipulatable bricks; in response to the brick connection request, updating the user interface to visually indicate the connection between the two or more of the user-manipulatable bricks in the modified set of user-manipulatable bricks; detecting an execution request to cause execution of the customized workflow as modified by the workflow modification request and the brick connection request; generating an executable software application at least in part by assembling a set of code modules corresponding to the modified set of user-manipulatable bricks; and executing the executable software application according to the execution request.

EI 9: The computer-implemented method of claim 8, further comprising generating a visual feedback based at least in part on the execution of the executable software application and displaying the visual feedback in the user interface.

EI 10: The computer-implemented method of claim 8, further comprising: determining that an output port of a first brick of the two or more bricks associated with the brick connection request and an input port of a second brick of the two or more bricks associated with the brick connection request are associated with a common data type; and updating the user interface to visually indicate the connection from the output port of the first brick to the input port of the second brick.

EI 11: The computer-implemented method of claim 8, wherein assembling the set of code modules comprises identifying a first code module that corresponds to a first user-manipulatable brick in the modified set of user-manipulatable bricks and a second code module that corresponds to a second user-manipulatable brick in the modified set of user-manipulatable bricks, and linking the first code module and the second code module based on the first user-manipulatable brick and the second user-manipulatable brick being connected to each other.

EI 12: The computer-implemented method of claim 8, further comprising: receiving a request to deploy the executable software application onto a target destination; modifying, based at least in part on the target destination, the specific machine learning model associated with a user-manipulatable brick of the first brick type included in the modified set of user-manipulatable bricks; and deploying, onto the target destination, a modified executable software application based at least in part on the modified specific machine learning model.

EI 13: The computer-implemented method of claim 12, wherein modifying the specific machine learning model comprises pruning the specific machine learning model such that executing the modified executable software application consumes a fewer amount of computing resources as a result of the modification.

EI 14: The computer-implemented method of claim 12, wherein modifying the specific machine learning model comprises replacing the specific machine learning model with another machine learning model such that executing the modified executable software application consumes a fewer amount of computing resources as a result of the modification.

EI 15: A non-transitory computer readable medium storing instructions that, when executed by a computing system, cause the computing system to perform operations comprising: detecting a request to load a workflow that includes a set of user-manipulatable bricks, wherein each user-manipulatable brick in the set of user-manipulatable bricks corresponds to a computer-implemented task to be performed as part of executing the workflow, and the set of user-manipulatable bricks includes multiple brick types including at least a first brick type representing a specific machine learning model; displaying visual indicators representing the set of user-manipulatable bricks of the workflow in a user interface along with a plurality of user-manipulatable bricks usable to modify the workflow; detecting, based on a first interaction by a user with at least one user-manipulatable brick displayed in the user interface, a workflow modification request to perform one or both of (i) adding one or more additional user-manipulatable bricks from the plurality of user-manipulatable bricks to the workflow, or (ii) removing one or more existing user-manipulatable bricks of the set of user-manipulatable bricks in the workflow; in response to the workflow modification request, causing the workflow displayed in the user interface to be modified according to the workflow modification request into a customized workflow that includes a modified set of user-manipulatable bricks; detecting, based on a second interaction by the user in the user interface, a brick connection request to connect two or more of the user-manipulatable bricks in the modified set of user-manipulatable bricks; in response to the brick connection request, updating the user interface to visually indicate the connection between the two or more of the user-manipulatable bricks in the modified set of user-manipulatable bricks; detecting an execution request to cause execution of the customized workflow as modified by the workflow modification request and the brick connection request; generating an executable software application at least in part by assembling a set of code modules corresponding to the modified set of user-manipulatable bricks; and executing the executable software application according to the execution request.

EI 16: The non-transitory computer readable medium of claim 15, storing further instructions that, when executed by the computing system, cause the computing system to perform operations comprising generating a visual feedback based at least in part on the execution of the executable software application and displaying the visual feedback in the user interface.

EI 17: The non-transitory computer readable medium of claim 15, storing further instructions that, when executed by the computing system, cause the computing system to perform operations comprising: determining that an output port of a first brick of the two or more bricks associated with the brick connection request and an input port of a second brick of the two or more bricks associated with the brick connection request are associated with a common data type; and updating the user interface to visually indicate the connection from the output port of the first brick to the input port of the second brick.

EI 18: The non-transitory computer readable medium of claim 15, storing further instructions that, when executed by the computing system, cause the computing system to perform operations comprising assembling the set of code modules comprises identifying a first code module that corresponds to a first user-manipulatable brick in the modified set of user-manipulatable bricks and a second code module that corresponds to a second user-manipulatable brick in the modified set of user-manipulatable bricks, and linking the first code module and the second code module based on the first user-manipulatable brick and the second user-manipulatable brick being connected to each other.

EI 19: The non-transitory computer readable medium of claim 15, storing further instructions that, when executed by the computing system, cause the computing system to perform operations comprising: receiving a request to deploy the executable software application onto a target destination; modifying, based at least in part on the target destination, the specific machine learning model associated with a user-manipulatable brick of the first brick type included in the modified set of user-manipulatable bricks; and deploying, onto the target destination, a modified executable software application based at least in part on the modified specific machine learning model.

EI 20: The non-transitory computer readable medium of claim 19, storing further instructions that, when executed by the computing system, cause the computing system to perform operations comprising modifying the specific machine learning model such that executing the modified executable software application consumes a fewer amount of computing resources as a result of the modification.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The term "set" is used to include "one or more." For example, a set of objects may include a single object or multiple objects.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for facilitating generation of a software application, the system comprising:
   a data repository storing data defining a plurality of pre-configured workflows and a plurality of user-manipulatable bricks usable to create a new workflow or to modify an existing workflow in the plurality of pre-configured workflows; and
   a workflow creation service comprising computer hardware, wherein the workflow creation service is configured to at least:
      detect a workflow load request to load a pre-configured workflow of the plurality of pre-configured workflows, wherein the pre-configured workflow includes a set of user-manipulatable bricks of the plurality of user-manipulatable bricks, each user-manipulatable brick in the set of user-manipulatable bricks corresponds to a computer-implemented task to be performed as part of executing the pre-configured workflow, and the set of user-manipulatable bricks includes multiple brick types including at least (i) a learnable brick type representing a specific machine learning model, (ii) an input brick type defining a data source storing input data usable by one or more other user-manipulatable bricks in the set of user-manipulatable bricks, and (iii) a transform brick type representing code configured to modify one or more characteristics of the input data to generate transformed input data in a format that the specific machine learning model is configured to receive as input features;
      cause visual indicators representing the set of user-manipulatable bricks of the pre-configured workflow to be displayed in a workflow modification user interface along with (i) the plurality of user-manipulatable bricks usable to modify the pre-configured workflow, and (ii) a user interface element configured to allow user modification of one or more parameters associated with one or more of the user-manipulatable bricks displayed in the workflow modification user interface, such that the pre-configured workflow and the user interface element are displayed in a same screen and allow a user to customize the pre-configured workflow with a user-manipulatable brick selected from the plurality of user-manipulatable bricks and specify one or more modifications to a parameter of the user-manipulatable brick in the user interface element all within the same screen, wherein causing the plurality of user-manipulatable bricks, the pre-configured workflow, and the user interface element to be displayed in the same screen allows the workflow creation service to: (i) subsequent to the selected user-manipulatable brick being added to the pre-configured workflow, receive a user input from the user selecting the user-manipulatable brick from the workflow modification user interface; (ii) in response to the user input from the user selecting the user-manipulatable brick from the workflow modification user interface, cause the user interface element to display a value field configured to receive the user input specifying the one or more modifications to the parameter of the selected user-manipulatable brick in the user interface element; and (iii) configure the selected user-manipulatable brick to perform an adjusted function based on the user input received via the value field of the user interface element;

detect, based on a first interaction by the user with at least one user-manipulatable brick displayed in the workflow modification user interface, a workflow modification request to perform one or both of (i) adding one or more additional user-manipulatable bricks from the plurality of user-manipulatable bricks displayed in the workflow modification user interface to the pre-configured workflow, or (ii) removing one or more existing user-manipulatable bricks of the set of user-manipulatable bricks in the pre-configured workflow;

in response to the workflow modification request, cause the pre-configured workflow displayed in the workflow modification user interface to be modified according to the workflow modification request into a customized workflow that includes a modified set of user-manipulatable bricks;

detect, based on a second interaction by the user in the workflow modification user interface, a brick connection request to connect two or more of the user-manipulatable bricks in the modified set of user-manipulatable bricks;

in response to the brick connection request, update the workflow modification user interface to visually indicate a connection between the two or more of the user-manipulatable bricks in the modified set of user-manipulatable bricks;

detect an execution request to cause execution of the customized workflow as modified by the workflow modification request and the brick connection request;

identify a set of code modules corresponding to the modified set of user-manipulatable bricks of the customized workflow, wherein each code module in the set of code modules is designated in the data repository as associated with a different user-manipulatable brick of the set of user-manipulatable bricks;

generate an executable software application at least in part by assembling the set of code modules; and cause the executable software application to be executed according to the execution request.

2. The system of claim 1, wherein the workflow creation service is further configured to generate a visual feedback based at least in part on execution of the executable software application and cause the visual feedback to be displayed in the workflow modification user interface.

3. The system of claim 1, wherein the workflow creation service is further configured to:
determine that an output port of a first brick of the two or more bricks associated with the brick connection request is associated with output data having a first data format;
determine that an input port of a second brick of the two or more bricks associated with the brick connection request is associated with input data having a second data format; and
based at least in part on the first data format matching the second data format, update the workflow modification user interface to visually indicate the connection from the output port of the first brick to the input port of the second brick.

4. The system of claim 1, wherein the system further comprises a code optimization and deployment service comprising computer hardware, wherein the code optimization and deployment service is configured to:
receive a code deployment request to deploy the executable software application onto a target destination;
modify, based at least in part on the target destination, the specific machine learning model associated with a user-manipulatable brick of the learnable brick type included in the modified set of user-manipulatable bricks to generate a modified specific machine learning model; and
cause a modified executable software application based at least in part on the modified specific machine learning model to be deployed onto the target destination.

5. The system of claim 4, wherein modifying the specific machine learning model comprises pruning the specific machine learning model such that executing the modified executable software application consumes a fewer amount of computing resources as a result of the modification of the specific machine learning model.

6. The system of claim 4, wherein modifying the specific machine learning model comprises replacing the specific machine learning model with another machine learning model such that executing the modified executable software application consumes a fewer amount of computing resources as a result of the modification of the specific machine learning model.

7. The system of claim 1, wherein the set of user-manipulatable bricks further includes (i) an input/output brick type defining a data source storing input data to the executable software application, and (ii) an evaluation brick type configured to generate a visual feedback based on a result of executing the executable software application.

8. The system of claim 1, wherein the user-manipulatable bricks in the modified set of user-manipulatable bricks comprise a set of two or more user-manipulatable bricks of the transform brick type, wherein each of the two or more user-manipulatable bricks of the transform brick type is configured to output its respective transformed output data to a user-manipulatable brick of the learnable brick type.

9. The system of claim 1, wherein the user-manipulatable bricks in the modified set of user-manipulatable bricks comprise a set of two or more user-manipulatable bricks of the transform brick type that are each configured to perform a transformation function different from that of another one of the two or more user-manipulatable bricks of the transform brick type, wherein all of the two or more user-manipulatable bricks of the transform brick type that are each configured to perform a transformation function are further configured to output respective transformed output data to a particular user-manipulatable brick of the transform brick type that is configured to perform a transformation function different from that of each of the two or more user-manipulatable bricks of the transform brick type to convert multiple inputs having a data type into a single output having the same data type as each of the multiple inputs, wherein the particular user-manipulatable brick is configured to (i) receive the respective transformed output data from each of the two or more user-manipulatable bricks of the transform brick type and (ii) output its further transformed output data to a user-manipulatable brick of the learnable brick type that is different from the transform brick type.

10. The system of claim 1, wherein a user-manipulatable brick of the transform brick type is configured to visually indicate, when displayed in the workflow modification user interface, an input data type associated with each input port of the user-manipulatable brick and an output data type associated with each output port of the user-manipulatable brick.

11. The system of claim 1, wherein the workflow creation service is further configured to:
  receive an indication that a user-manipulatable brick of the transform brick type displayed in the workflow modification user interface has been selected; and
  cause a user interface element to be displayed in the workflow modification user interface, wherein the user interface element is configured to allow, in response to the selection of the user-manipulatable brick of the transform brick type displayed in the workflow modification user interface, user viewing and modification of one or more data transformation parameters that specify how input data received by the selected user-manipulatable brick of the transform brick type is to be transformed.

12. The system of claim 1, wherein the workflow creation service is further configured to cause another user interface element to be displayed in the same screen as the plurality of user-manipulatable bricks, the pre-configured workflow, and the user interface element configured to allow user modification, wherein said another user interface element is configured to show a visualization associated with the user-manipulatable brick selected and added to the pre-configured workflow.

13. The system of claim 9, wherein the particular user-manipulatable brick of the transform brick type is configured to combine multiple inputs of a dataframe data type into a single output of a dataframe data type transmitted to the user-manipulatable brick of the learnable brick type that is different from the transform brick type.

14. The system of claim 11, wherein the workflow creation service is further configured to transform the input data received by the selected user-manipulatable brick of the transform brick type using the one or more data transformation parameters modified via the user interface element.

15. The system of claim 1, wherein the workflow creation service is further configured to cause the plurality of user-manipulatable bricks, the pre-configured workflow, and the user interface element to be displayed in the same screen such that the user is allowed to select the user-manipulatable brick from the plurality of user-manipulatable bricks, add the selected user-manipulatable brick to the pre-configured workflow, and specify the one or more modifications to the parameter of the added user-manipulatable brick in the user interface element all within the same screen.

16. A computer-implemented method for facilitating generation of a software application, the method comprising:
  detecting a request to load a workflow that includes a set of user-manipulatable bricks, wherein each user-manipulatable brick in the set of user-manipulatable bricks corresponds to a computer-implemented task to be performed as part of executing the workflow, and the set of user-manipulatable bricks includes multiple brick types including at least a first brick type representing a specific machine learning model, a second brick type defining a data source storing input data usable by one or more other user-manipulatable bricks in the set of user-manipulatable bricks, and a third brick type representing code configured to generate transformed input data in a format that the specific machine learning model is configured to receive as input features;
  displaying visual indicators representing the set of user-manipulatable bricks of the workflow in a user interface along with (i) a plurality of user-manipulatable bricks usable to modify the workflow, and (ii) a user interface element configured to allow user modification of one or more parameters associated with one or more of the user-manipulatable bricks displayed in a workflow modification user interface, such that the workflow and the user interface element are displayed in a same screen and allow a user to customize the workflow with a user-manipulatable brick selected from the set of user-manipulatable bricks and specify one or more modifications to a parameter of the user-manipulatable brick in the user interface element all within the same screen, wherein causing the plurality of user-manipulatable bricks, the workflow, and the user interface element to be displayed in the same screen allows a workflow creation service to: (i) subsequent to the selected user-manipulatable brick being added to the workflow, receive a user input from the user selecting the user-manipulatable brick from the workflow modification user interface; (ii) in response to the user input from the user selecting the user-manipulatable brick from the workflow modification user interface, cause the user interface element to display a value field configured to receive a user input specifying the one or more modifications to the parameter of the selected user-manipulatable brick in the user interface element; and (iii) configure the selected user-manipulatable brick to perform an adjusted function based on the user input received via the value field of the user interface element;
  detecting, based on a first interaction by the user with at least one user-manipulatable brick displayed in the user interface, a workflow modification request to perform one or both of (i) adding one or more additional user-manipulatable bricks from the plurality of user-manipulatable bricks to the workflow, or (ii) removing one or more existing user-manipulatable bricks of the set of user-manipulatable bricks in the workflow;
  in response to the workflow modification request, causing the workflow displayed in the user interface to be modified according to the workflow modification request into a customized workflow that includes a modified set of user-manipulatable bricks;
  detecting, based on a second interaction by the user in the user interface, a brick connection request to connect two or more of the user-manipulatable bricks in the modified set of user-manipulatable bricks;
  in response to the brick connection request, updating the user interface to visually indicate a connection between the two or more of the user-manipulatable bricks in the modified set of user-manipulatable bricks;

detecting an execution request to cause execution of the customized workflow as modified by the workflow modification request and the brick connection request;

generating an executable software application at least in part by assembling a set of code modules corresponding to the modified set of user-manipulatable bricks; and executing the executable software application according to the execution request.

17. The computer-implemented method of claim 16, further comprising generating a visual feedback based at least in part on execution of the executable software application and displaying the visual feedback in the user interface.

18. The computer-implemented method of claim 16, further comprising:

determining that an output port of a first brick of the two or more bricks associated with the brick connection request and an input port of a second brick of the two or more bricks associated with the brick connection request are associated with a common data type; and updating the user interface to visually indicate the connection from the output port of the first brick to the input port of the second brick.

19. The computer-implemented method of claim 16, wherein assembling the set of code modules comprises identifying a first code module that corresponds to a first user-manipulatable brick in the modified set of user-manipulatable bricks and a second code module that corresponds to a second user-manipulatable brick in the modified set of user-manipulatable bricks, and linking the first code module and the second code module based on the first user-manipulatable brick and the second user-manipulatable brick being connected to each other.

20. The computer-implemented method of claim 16, further comprising:

receiving a request to deploy the executable software application onto a target destination;

modifying, based at least in part on the target destination, the specific machine learning model associated with a user-manipulatable brick of the first brick type included in the modified set of user-manipulatable bricks to generate a modified specific machine learning model; and deploying, onto the target destination, a modified executable software application based at least in part on the modified specific machine learning model.

21. The computer-implemented method of claim 20, wherein modifying the specific machine learning model comprises pruning the specific machine learning model such that executing the modified executable software application consumes a fewer amount of computing resources as a result of the modification of the specific machine learning model.

22. The computer-implemented method of claim 20, wherein modifying the specific machine learning model comprises replacing the specific machine learning model with another machine learning model such that executing the modified executable software application consumes a fewer amount of computing resources as a result of the modification of the specific machine learning model.

23. A non-transitory computer-readable medium storing instructions that, when executed by a computing system, cause the computing system to perform operations comprising:

detecting a request to load a workflow that includes a set of user-manipulatable bricks, wherein each user-manipulatable brick in the set of user-manipulatable bricks corresponds to a computer-implemented task to be performed as part of executing the workflow, and the set of user-manipulatable bricks includes multiple brick types including at least a first brick type representing a specific machine learning model, a second brick type defining a data source storing input data usable by one or more other user-manipulatable bricks in the set of user-manipulatable bricks, and a third brick type representing code configured to generate transformed input data in a format that the specific machine learning model is configured to receive as input features;

displaying visual indicators representing the set of user-manipulatable bricks of the workflow in a user interface along with (i) a plurality of user-manipulatable bricks usable to modify the workflow, and (ii) a user interface element configured to allow user modification of one or more parameters associated with one or more of the user-manipulatable bricks displayed in a workflow modification user interface, such that the workflow and the user interface element are displayed in a same screen and allow a user to customize the workflow with a user-manipulatable brick selected from the set of user-manipulatable bricks and specify one or more modifications to a parameter of the user-manipulatable brick in the user interface element all within the same screen, wherein causing the plurality of user-manipulatable bricks, the workflow, and the user interface element to be displayed in the same screen allows a workflow creation service to: (i) subsequent to the selected user-manipulatable brick being added to the workflow, receive a user input from the user selecting the user-manipulatable brick from the workflow modification user interface; (ii) in response to the user input from the user selecting the user-manipulatable brick from the workflow modification user interface, cause the user interface element to display a value field configured to receive the user input specifying the one or more modifications to the parameter of the selected user-manipulatable brick in the user interface element; and (iii) configure the selected user-manipulatable brick to perform an adjusted function based on the user input received via the value field of the user interface element;

detecting, based on a first interaction by the user with at least one user-manipulatable brick displayed in the user interface, a workflow modification request to perform one or both of (i) adding one or more additional user-manipulatable bricks from the plurality of user-manipulatable bricks to the workflow, or (ii) removing one or more existing user-manipulatable bricks of the set of user-manipulatable bricks in the workflow;

in response to the workflow modification request, causing the workflow displayed in the user interface to be modified according to the workflow modification request into a customized workflow that includes a modified set of user-manipulatable bricks;

detecting, based on a second interaction by the user in the user interface, a brick connection request to connect two or more of the user-manipulatable bricks in the modified set of user-manipulatable bricks;

in response to the brick connection request, updating the user interface to visually indicate a connection between the two or more of the user-manipulatable bricks in the modified set of user-manipulatable bricks;

detecting an execution request to cause execution of the customized workflow as modified by the workflow modification request and the brick connection request;

generating an executable software application at least in part by assembling a set of code modules corresponding to the modified set of user-manipulatable bricks; and executing the executable software application according to the execution request.

24. The non-transitory computer-readable medium of claim 23, storing further instructions that, when executed by the computing system, cause the computing system to perform operations comprising generating a visual feedback based at least in part on execution of the executable software application and displaying the visual feedback in the user interface.

25. The non-transitory computer-readable medium of claim 23, storing further instructions that, when executed by the computing system, cause the computing system to perform operations comprising:

determining that an output port of a first brick of the two or more bricks associated with the brick connection request and an input port of a second brick of the two or more bricks associated with the brick connection request are associated with a common data type; and updating the user interface to visually indicate the connection from the output port of the first brick to the input port of the second brick.

26. The non-transitory computer-readable medium of claim 23, storing further instructions that, when executed by the computing system, cause the computing system to perform operations comprising assembling the set of code modules comprises identifying a first code module that corresponds to a first user-manipulatable brick in the modified set of user-manipulatable bricks and a second code module that corresponds to a second user-manipulatable brick in the modified set of user-manipulatable bricks, and linking the first code module and the second code module based on the first user-manipulatable brick and the second user-manipulatable brick being connected to each other.

27. The non-transitory computer-readable medium of claim 23, storing further instructions that, when executed by the computing system, cause the computing system to perform operations comprising:

receiving a request to deploy the executable software application onto a target destination;

modifying, based at least in part on the target destination, the specific machine learning model associated with a user-manipulatable brick of the first brick type included in the modified set of user-manipulatable bricks to generate a modified specific machine learning model; and deploying, onto the target destination, a modified executable software application based at least in part on the modified specific machine learning model.

28. The non-transitory computer-readable medium of claim 27, storing further instructions that, when executed by the computing system, cause the computing system to perform operations comprising modifying the specific machine learning model such that executing the modified executable software application consumes a fewer amount of computing resources as a result of the modification of the specific machine learning model.

\* \* \* \* \*